United States Patent
Marinier et al.

(10) Patent No.: US 11,601,226 B2
(45) Date of Patent: Mar. 7, 2023

(54) RECEIVER FEEDBACK IN WIRELESS SYSTEMS

(71) Applicant: IDAC Holdings, Inc., Wilmington, DE (US)

(72) Inventors: Paul Marinier, Brossard (CA); J. Patrick Tooher, Montreal (CA); Faris Alfarhan, Montreal (CA); Ghyslain Pelletier, Montreal (CA); Aata El Hamss, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 270 days.

(21) Appl. No.: 16/472,851

(22) PCT Filed: Jan. 3, 2018

(86) PCT No.: PCT/US2018/012154
§ 371 (c)(1),
(2) Date: Jun. 21, 2019

(87) PCT Pub. No.: WO2018/129017
PCT Pub. Date: Jul. 12, 2018

(65) Prior Publication Data
US 2020/0195386 A1      Jun. 18, 2020

Related U.S. Application Data

(60) Provisional application No. 62/542,927, filed on Aug. 9, 2017, provisional application No. 62/519,675, filed
(Continued)

(51) Int. Cl.
*H04L 1/18* (2006.01)
*H04L 1/00* (2006.01)
(Continued)

(52) U.S. Cl.
CPC .......... *H04L 1/1845* (2013.01); *H04L 1/0088* (2013.01); *H04L 1/1854* (2013.01); *H04L 1/1861* (2013.01); *H04L 1/1896* (2013.01)

(58) Field of Classification Search
CPC ... H04L 1/1896; H04L 1/0088; H04L 1/1861; H04L 1/1845; H04L 1/1854
See application file for complete search history.

(56) References Cited

U.S. PATENT DOCUMENTS 62,432,215 * 12/2016 Papasakellariou
62,436,705 * 12/2016 Papasakellariou
(Continued)

FOREIGN PATENT DOCUMENTS

CN  102396176 A  3/2012
CN  102668482 A  9/2012
(Continued)

OTHER PUBLICATIONS

CN 104283651 A, Cited in Written Opinion dated Aug. 4, 2020, in related Singapore Patent Application No. 11201905959P.
(Continued)

*Primary Examiner* — Oussama Roudani
(74) *Attorney, Agent, or Firm* — Jamie T. Nguyen

(57) ABSTRACT

Systems, methods, and instrumentalities are disclosed for receiver feedback in wireless systems. Receiver feedback format, content, type and/or timing may be determined as a function of, for example, at least one of a type of soft-combining processing to apply in a HARQ process, a HARQ operating point for the HARQ process, one or more reference transmissions for controlling a type of HARQ feedback for the HARQ process, and a feedback suppression parameter for one or more transmissions in a sequence associated with the HARQ process or a transport block (TB). Uniform and non-uniform CB-to-CBG mapping may be provided
(Continued)

(e.g., by a WTRU) based on, for example, one or more parameters, interference and channel conditions and/or a probability of or actual pre-empting transmissions. A CB to CBG mapping indication may be provided, for example, in support of selecting a CB to CBG mapping from multiple CB to CBG mappings. Intra- and inter-WTRU interference/preemption indications may be provided.

16 Claims, 7 Drawing Sheets

Related U.S. Application Data on Jun. 14, 2017, provisional application No. 62/500,989, filed on May 3, 2017, provisional application No. 62/453,085, filed on Feb. 1, 2017, provisional application No. 62/442,093, filed on Jan. 4, 2017.

(51) Int. Cl.
*H04L 1/1829* (2023.01)
*H04L 1/1867* (2023.01)

(56) References Cited

U.S. PATENT DOCUMENTS

| | | | |
|---|---|---|---|
| 2011/0276852 A1* | 11/2011 | Mueller-Weinfurtner | H04L 1/1835 714/749 |
| 2012/0005550 A1 | 1/2012 | Ito | |
| 2012/0026935 A1 | 2/2012 | Park et al. | |
| 2012/0269137 A1* | 10/2012 | Kang | H04L 5/0023 370/329 |
| 2012/0275409 A1 | 11/2012 | Han et al. | |
| 2013/0010745 A1 | 1/2013 | Ko | |
| 2014/0032991 A1 | 1/2014 | Fu | |
| 2016/0036578 A1 | 2/2016 | Malladi et al. | |
| 2016/0226643 A1 | 8/2016 | Mallik et al. | |
| 2016/0233999 A1 | 8/2016 | Chendamarai et al. | |
| 2017/0142593 A1 | 5/2017 | Seo et al. | |
| 2017/0207895 A1 | 7/2017 | Yang et al. | |
| 2018/0123767 A1* | 5/2018 | Islam | H04L 1/1816 |
| 2018/0145797 A1* | 5/2018 | Yeo | H04L 1/1896 |
| 2018/0167931 A1* | 6/2018 | Papasakellariou | H04L 1/00 |
| 2019/0007959 A1 | 1/2019 | Hwang et al. | |
| 2019/0020445 A1 | 1/2019 | Kim et al. | |
| 2019/0379487 A1* | 12/2019 | Hwang | H04L 1/0068 |

FOREIGN PATENT DOCUMENTS

| | | |
|---|---|---|
| CN | 102823184 A | 12/2012 |
| CN | 104283651 A | 1/2015 |
| CN | 104301077 A | 1/2015 |
| WO | WO 2010113214 A1 | 10/2010 |
| WO | WO 2016/003229 A1 | 1/2016 |
| WO | WO 2016/021957 A1 | 2/2016 |
| WO | WO 2016175029 A1 | 11/2016 |

OTHER PUBLICATIONS

CN 104301077 A, Cited in Written Opinion dated Aug. 4, 2020, in related Singapore Patent Application No. 11201905959P.
3rd Generation Partnership Project (3GPP), R1-1611099, "HARQ-ACK Bundling for FeMTC", Ericsson, 3GPP TSG-RAN WG1 meeting #87, Reno, Nevada, USA, Nov. 14-18, 2016, 7 pages.
3rd Generation Partnership Project (3GPP), R1-1612244, "HARQ Operation for Large Transport Block Sizes", Nokia, Alcatel-Lucent Shanghai Bell, 3GPP TSG-RAN WG1#87, Reno, U.S.A., Nov. 14-18, 2016, 5 pages.
3rd Generation Partnership Project (3GPP), TS 36.213 V13.2.0, "Technical Specification Group Radio Access Network, Evolved Universal Terrestrial Radio Access (E-UTRA), Physical Layer Procedures (Release 13)", Jun. 2016, 381 pages.
3rd Generation Partnership Project (3GPP), TS 36.300 V13.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 13)", Mar. 2016, 295 pages.
3rd Generation Partnership Project (3GPP), TS 36.321 V13.1.0, "Technical Specification Group Radio Access Network, Evolved Universal Terrestrial Radio Access (E-UTRA), Medium Access Control (MAC) Protocol Specification (Release 13)", Mar. 2016, 85 pages.
3rd Generation Partnership Project (3GPP), TS 36.331 V13.1.0, "Technical Specification Group Radio Access Network, Evolved Universal Terrestrial Radio Access (E-UTRA), Radio Resource Control (RRC), Protocol Specification (Release 13)", Mar. 2016, 551 pages.
3rd Generation Partnership Project (3GPP), R1-1609059, "Multiplexing URLLC and eMBB in DL", Samsung, 3GPP TSG RAN WG1 Meeting #86bis, Lisbon, Portugal, Oct. 10-14, 2016, pp. 1-5.
Samsung, "Partial retransmission for eMBB", 3GPP Tdoc R1-1612535, 3GPP TSG RAN WG1 Meeting #87, Reno, USA, Nov. 14-18, 2016, 3 pages.
WO 2016175029 A1, English Language Abstract.
Interdigital Communications, "Multi-bit HARQ feedback", 3GPP Tdoc R1-1700706, 3GPP TSG RAN WG1 AH_NR Meeting, Spokane, USA, Jan. 16-20, 2017, 2 pages.

* cited by examiner

RECEIVER FEEDBACK IN WIRELESS SYSTEMS

CROSS-REFERENCE TO RELATED APPLICATIONS

This application is the National Stage entry under 35 U.S.C. § 371 of Patent Cooperation Treaty Application PCT/US2018/012154, filed Jan. 3, 2018, which claims priority to and the benefit of U.S. Provisional Application Ser. No. 62/442,093, filed Jan. 4, 2017, 62/453,085, filed Feb. 1, 2017, 62/500,989, filed May 3, 2017, 62/519,675, filed Jun. 14, 2017, and 62/542,927, filed Aug. 9, 2017, which are all hereby incorporated by reference herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are disclosed for receiver feedback in wireless systems. Receiver feedback format, content, type and/or timing may be determined as a function of, for example, a hybrid automatic repeat request (HARQ) processing state. The HARQ processing state may correspond to, for example, a sequence in transmission for a HARQ process, a maximum time for the HARQ process to succeed, measured or estimated link quality, demodulation performance and/or a number of codeblocks successfully decoded. Receiver feedback format, content, type and/or timing may be determined as a function of, for example, configuration of a wireless transmit/receive unit (WTRU). The configuration may indicate one or more of a type of soft-combining processing to apply in a HARQ process, a HARQ operating point for the HARQ process, one or more reference transmissions for controlling a type of HARQ feedback for the HARQ process, a feedback suppression parameter for one or more transmissions in a sequence associated with the HARQ process or a transport block (TB). Transmission (e.g., efficient) of subsets of one or more codeblock groups (CBGs) may be used. Adaptive resource allocation may be used for transmitting subsets of one or more CBGs. Minislots may be used for retransmission of subsets of one or more CBGs. A WTRU may monitor a (e.g., a new downlink) downlink control channel (e.g., when expecting a transmission). Retransmission of a CBG index may be indicated. The timing relationship between the downlink assignment, (re)transmissions, and adaptive feedback for adaptive slot size may be used. Uniform and non-uniform CB-to-CBG mapping may be provided (e.g. by a WTRU) based on, for example, one or more parameters, interference and channel conditions and/or a probability of or actual pre-empting transmissions. A CB to CBG mapping indication may be provided, for example, in support of selecting a CB to CBG mapping from multiple CB to CBG mappings. Intra- and inter-WTRU interference/preemption indications may be provided. A feedback-bit counter Downlink Assignment Index (DAI) may enable a WTRU to determine how feedback bits would have been required for the feedback report of a missed DL assignment. Adaptive Bundling of feedback report bits to achieve fixed feedback report sizes per DL assignment may be used. Unequal reliability for a multiplexed feedback report may be used.

A WTRU and the wireless communications system may have one of more computer processors configured (e.g., programmed with executable instructions). For example, a WTRU may have a processor that is configured to communicate with the wireless communications network (e.g., using UR-LLC communications). The WTRU processor may be configured to receive first downlink control information (DCI) that indicates whether transport block (TB)-based hybrid automatic repeat request (HARQ) feedback should be provided for a downlink transmission or if code block group (CBG)-based HARQ feedback should be provided for the downlink transmission. The WTRU processor may be configured to receive the downlink transmission, associated with the first DCI, that includes a transport block that has one or more code blocks. The WTRU processor may be configured to attempt to decode the one or more code blocks of the transport block. The WTRU processor may be configured to determine that the first DCI indicates that CBG-based HARQ feedback should be provided. If the processor determines that the first DCI indicates that CBG-based HARQ feedback should be provided, the WTRU processor may be configured to determine a mapping of the one or more code blocks into one or more CBGs; determine HARQ feedback for at least one of the one or more CBGs based on whether corresponding code blocks for the at least one CBG were successfully decoded, and transmit the HARQ feedback for the one or more CBGs to the wireless communications network. The WTRU processor may be configured to determine that the first DCI indicates that TB-based HARQ feedback should be provided. If the WTRU processor determines that the first DCI indicates that TB-based HARQ feedback should be provided, the WTRU processor may be configured to determine HARQ feedback for the transport block, and transmit the HARQ feedback for the transport block to the wireless communications network.

The mapping may be a mapping of the one or more code blocks to the code block group in at least one of frequency or time. The mapping may be based on one or more of: a number of subcarriers or OFDM symbols assigned to the code block group or the transmission, a maximum code block length, a number of code block groups in the transmission, a number of code blocks in the transmission; and a number of time symbols and/or resource blocks occupied by a potential pre-empting transmission.

The determined HARQ feedback for the one or more CBGs may be an ACK if each of the corresponding code blocks was successfully decoded and a NACK if one or more of the one or more code blocks was not successfully decoded. The WTRU processor may be configured to receive a retransmission from the wireless communications network in response to a transmitted NACK. The wireless communications network may have a processor that is configured to receive the transmitted ACK or NACK and to determine to send a retransmission if a NACK is received.

The WTRU processor may be configured to receive a second DCI that is for a retransmission. The second DCI may indicate which CBGs are being retransmitted. The second DCI may indicate which CBGs included in the retransmission can be combined with previously received CBGs when performing soft decoding. The second DCI may include a bitmap that may be used to indicates which CBGs included in the retransmission can be combined with previously received CBGs when performing soft decoding. The wireless communications network may have a processor that is configured to determine to send the second DCI and the contents of the second DCI.

The WTRU processor may be configured to monitor for first downlink control information and to monitor for second downlink control information based on a preemption instruction from the wireless communications network. The wireless communications network may have a processor that is configured to determine to send preemption instructions to the WTRU.

The WTRU may comprise a HARQ buffer. The WTRU processor may be configured to manage the HARQ buffer and to discard data in the HARQ buffer if the one or more code blocks are not successfully decoded.

The WTRU processor may be configured to determine a preemption indication to send in uplink control information to the wireless communications network if the one or more code blocks are not successfully decoded.

The wireless communications network may have a processor that is configured to determine send first downlink control information (DCI) that indicates whether transport block (TB)-based hybrid automatic repeat request (HARQ) feedback should be provided for a downlink transmission or if code block group (CBG)-based HARQ feedback should be provided for the downlink transmission and to transmit the first downlink control information. The wireless communications network may have a processor that is configured to receive a transmitted HARQ feedback including a TB-based HARQ feedback.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
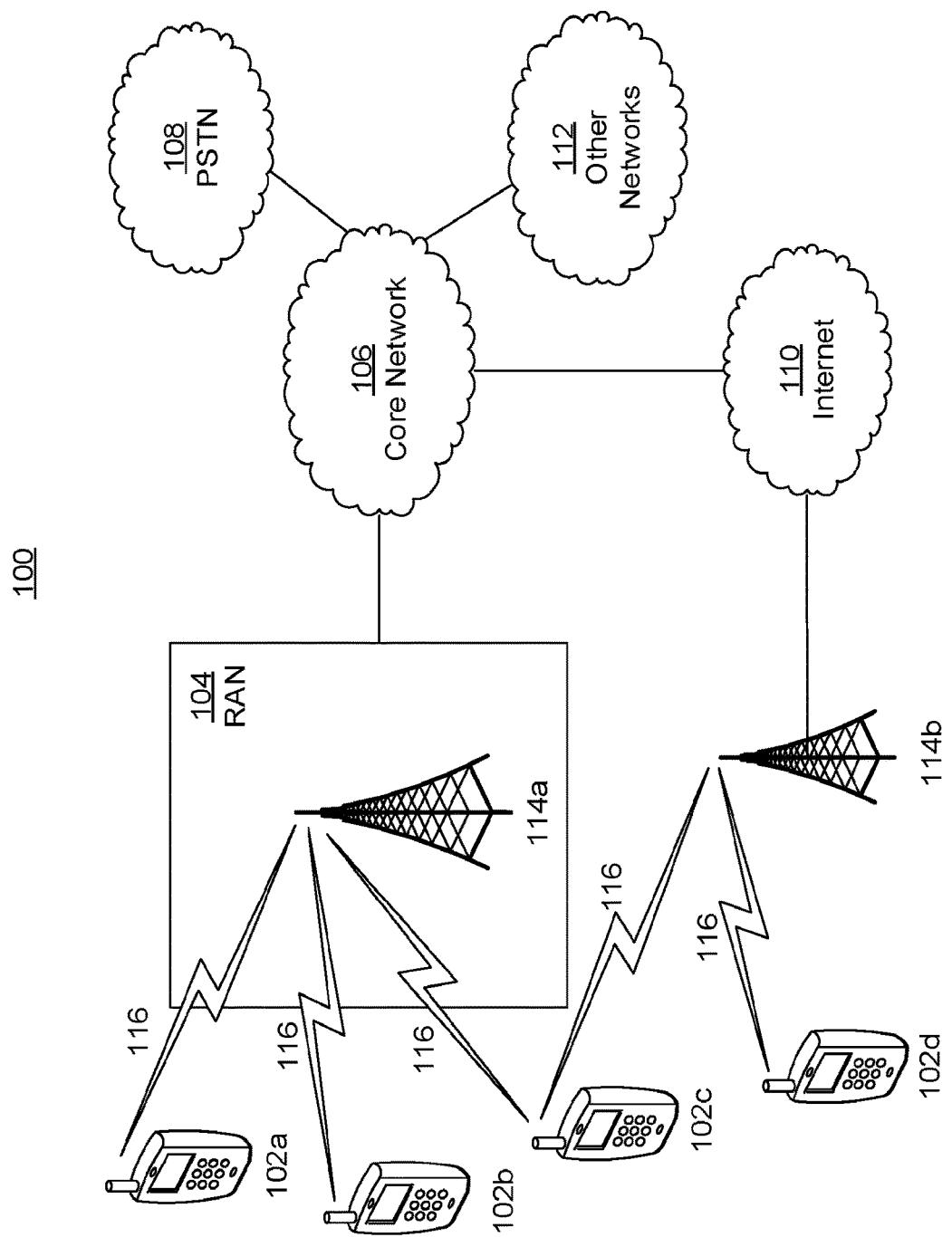
FIG. 1A is a system diagram illustrating an example communications system in which one or more disclosed examples may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
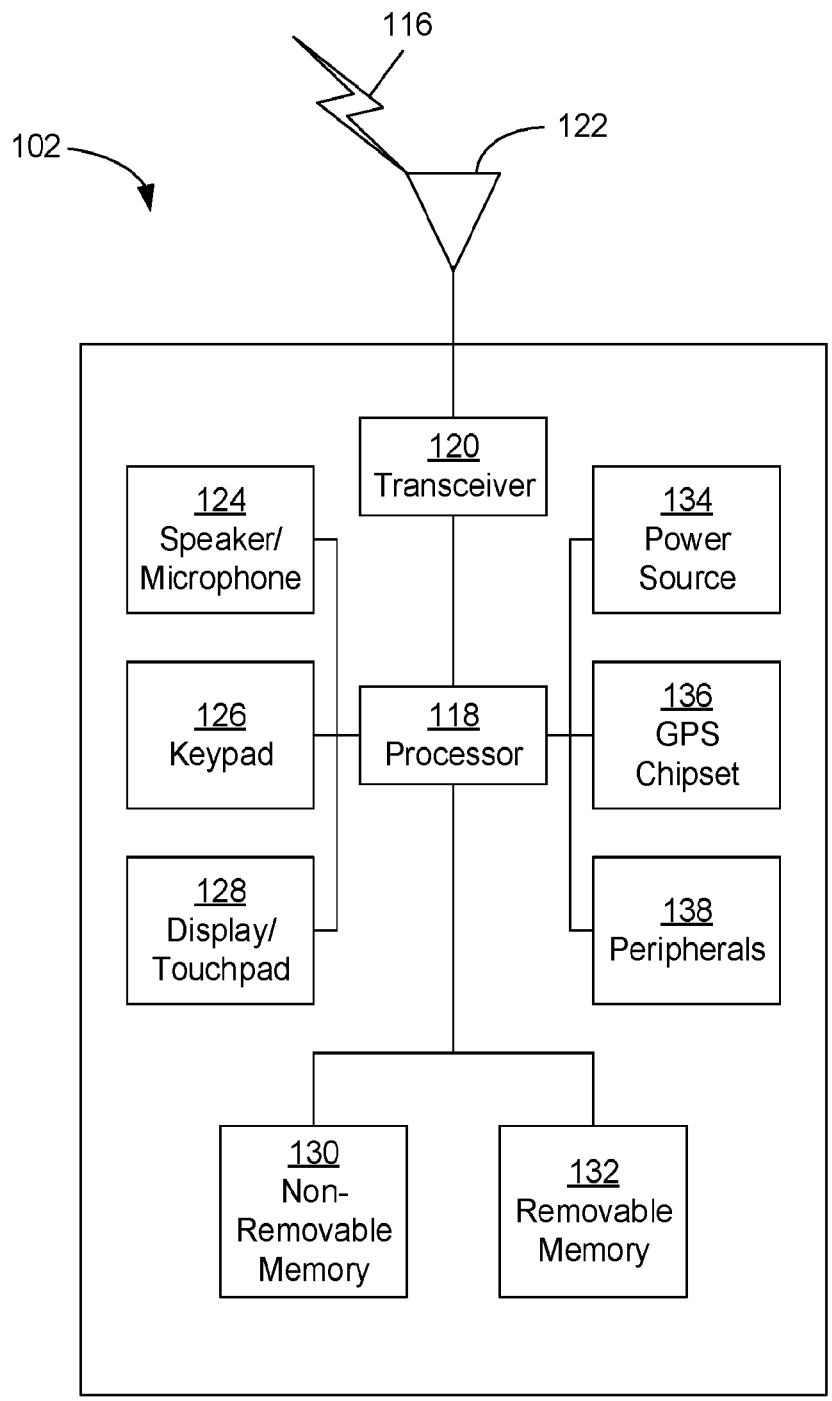
FIG. 1B is a system diagram illustrating an example wireless transmit/receive unit (WTRU) that may be used within the communications system illustrated in FIG. 1A according to an example.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
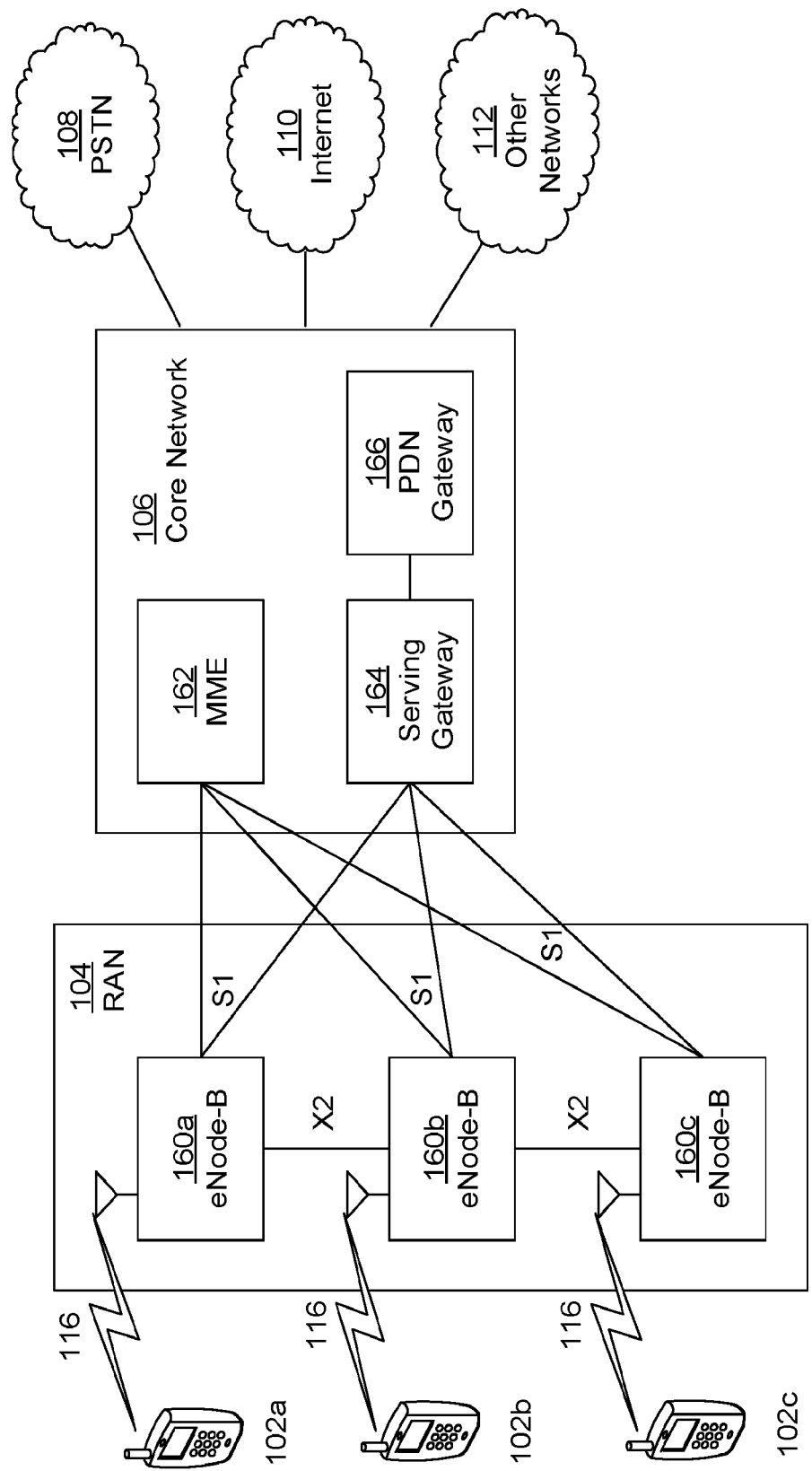
FIG. 1C is a system diagram illustrating an example radio access network (RAN) and an example core network (CN) that may be used within the communications system illustrated in FIG. 1A according to an example.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
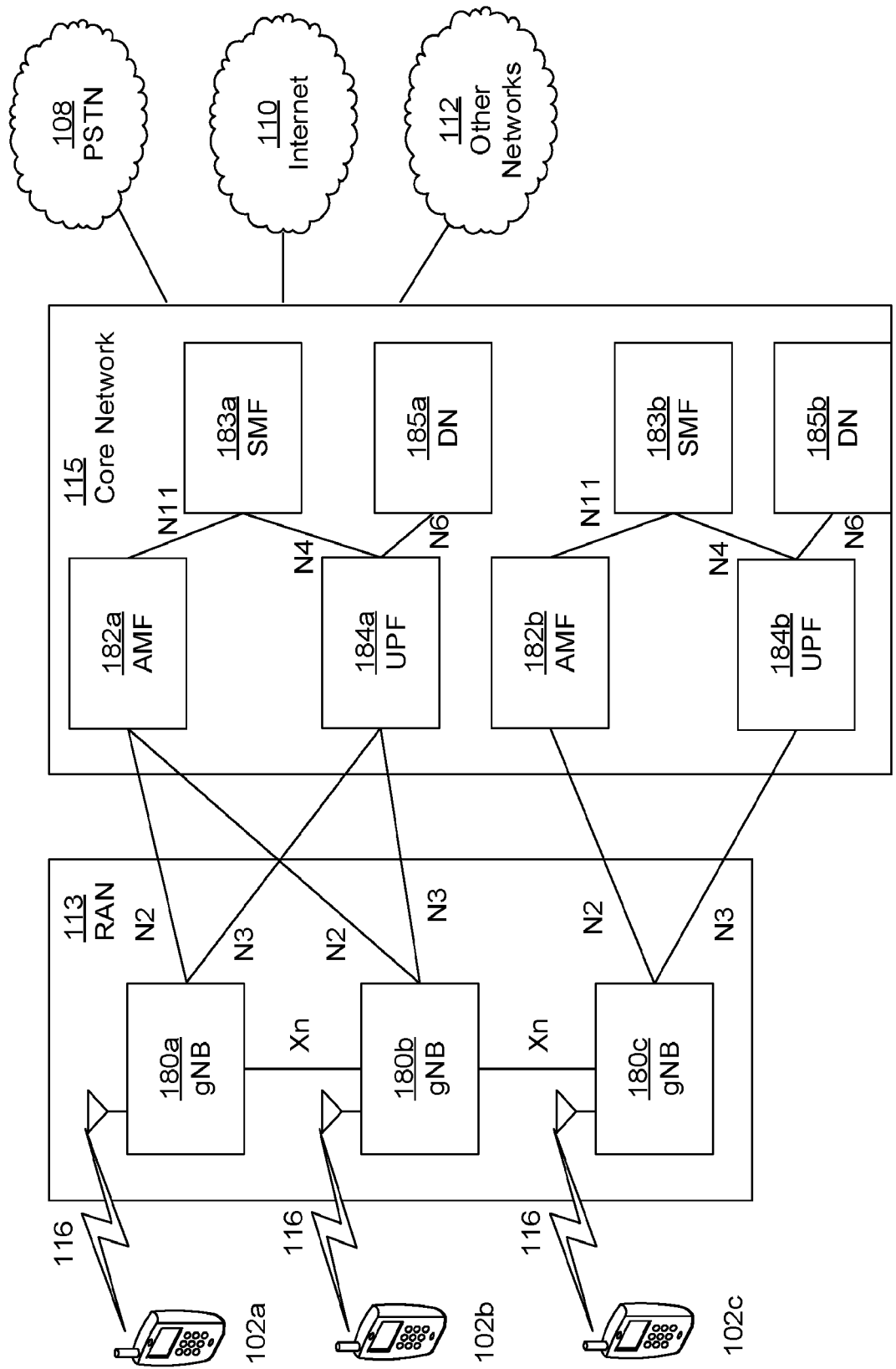
FIG. 1D is a system diagram illustrating a further example RAN and a further example CN that may be used within the communications system illustrated in FIG. 1A according to an example.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Network may refer to one or more gNBs that may be associated with one or more Transmission/Reception Points (TRPs) or other node(s) in a radio access network.

Mobile communications are in continuous evolution. The fifth generation of evolution is referred to as 5G.

HARQ-related feedback may support codeblock-based HARQ operation and/or puncturing of transmissions. One or more of per-transmission measurement-based probabilistic feedback, per codeblock feedback, and/or per-TB feedback may be combined. Support may be provided for switching reporting (e.g., reporting types and/or methods) for a HARQ process and/or for a TB (e.g., to optimize the tradeoff between granularity vs. overhead assuming a given HARQ operating point).

Sub-TB feedback configurations (e.g., different sub-TB regions can be configured with different HARQ feedback types) may be used. A feedback request may be used (e.g., for sub-TB resources), for example regardless of whether such sub-TB resource is included in a current retransmission). For example, a feedback request may confirm previous probabilistic HARQ feedback. A WTRU may select sub-TB resources to feedback. Sub-TB resources may be retransmitted (e.g., mapping of a subset of sub-TB resources, methods to reuse unused resources, and methods to control soft combining).

A 5G system may correspond, e.g., at least in part, to a new radio (NR) access technology.

A 5G air interface may support ultra-low latency (LLC) transmission, ultra-reliable transmission (URC) and/or machine-type communications (MTC) operation, which may include narrowband operation. These communications may be referred to as UR-LLC communications.

In an example of support for LLC, an air interface latency may be, for example, 1 ms round trip time (RTT). A transmission time interval (TTI) may be, for example, between 100 us and 250 us.

Support may be provided for ultra-low access latency (e.g., time from initial system access until the completion of the transmission of the first user plane data unit).

A communication (e.g., IC and/or vehicular to everything communication (V2X)) may have end-to-end (e2e) latency, for example, less than 10 ms.

In an example of support for URC, transmission reliability may be, for example, approximately 99.999% transmission success and service availability.

Support may be provided for mobility. Mobility speed may range, for example, from 0- to 500 km/h.

Support may be provided for a packet Loss Ratio (PLR) less than $10e^{-6}$ for communications (e.g., IC and V2X).

In an example of support for MTC operation, an air interface may support narrowband operation (e.g., using less than 200 KHz), extended battery life (e.g., up to 15 years of autonomy) and/or minimal communication overhead for small and infrequent data transmissions (e.g. low data rate in the range of 1-100 kbps with access latency of seconds to hours).

Orthogonal Frequency-Division Multiplexing (OFDM) may be used as a signal format for data transmissions, e.g., for LTE and/or IEEE 802.11. OFDM may be used to divide spectrum into multiple parallel orthogonal subbands. A (e.g., each) subcarrier may be shaped using a rectangular window in the time domain, which may lead to sinc-shaped subcarriers in the frequency domain. OFDM Access (OFDMA) may be implemented with (e.g., perfect) frequency synchronization and (e.g., tight) management of uplink timing alignment within the duration of a cyclic prefix, for example, to maintain orthogonality between signals and to minimize intercarrier interference. Tight synchronization may be a challenge, for example, in a system where a WTRU may be simultaneously connected to multiple access points. Additional power reduction may be applied to uplink transmissions, e.g., to comply with spectral emission requirements in adjacent bands, which may occur in the presence of aggregation of fragmented spectrum for a WTRU's transmissions.

OFDM (e.g., cyclic prefix (CP)-OFDM) implementations may apply more stringent RF requirements, such as when operating with a large contiguous spectrum without requiring aggregation. A CP-based OFDM transmission scheme may lead to a downlink physical layer for 5G similar to preceding generations, such as modifications to pilot signal density and location.

5G NR access may use a waveform other than OFDM for 5G systems.

A Reference Signal (RS) may refer to any reference signal, preamble or system signature that may be received and/or transmitted by a WTRU, e.g., for one or more purposes described herein. A different RS may be defined for downlink (DL) and uplink (UL) transmissions. For example (e.g., in DL), a reference may correspond to a channel state information reference signal (CSI-RS), a demodulation reference signal (DMRS), a synchronization signal, a beam reference signal (BRS) or similar. For example (e.g., in UL), a reference signal may correspond to a sounding reference signal (SRS), a demodulation reference signal (DMRS), a preamble, a beam reference signal (BRS) or similar.

A 5G system may support transmission of data with different requirements, e.g., in terms of latency, throughput and reliability, which may lead to different processing principles and transmission properties. In an example, data (e.g., associated with ultra-low latency and/or ultra-reliable use cases) may be transmitted using a (e.g., very) short transmission time interval (TTI), such as a mini-slot (e.g., using a number x of symbols and/or a first numerology) within slot-based framing (e.g., with a modest payload per TTI). Data (e.g. associated with mobile broadband or massive MTC use cases) may be transmitted using a longer TTI (e.g., to reduce control channel overhead), for example, by using a slot-based transmission (e.g., using a number y>x symbols and/or using a second numerology).

Data (e.g., data associated with ultra-low latency or ultra-reliable use cases) may be transmitted with a very tight delay from the time it is generated by an application layer. It may be unacceptable to delay transmission of the data until the end of an on-going transmission using a larger TTI. Reserving resources for exclusive use may be inefficient, for example, given that delay-sensitive traffic may be sporadic. Next generation (e.g., 5G) wireless systems may support transmission of delay-sensitive data in resources used for an on-going transmission while maintaining robust performance for both transmissions.

Codeblock-based hybrid automatic repeat request (HARQ) processing may be supported. Data (e.g., a MAC PDU) contained in a transmission (e.g., transmitted as a transport block (TB)) may be (e.g., further) encoded using block-based coding. A TB may contain one or more code blocks (CB) associated with one or more MAC PDUs. Block-based encoding may be useful, for example, to isolate and/or confine transmission errors and/or puncturing events to a specific portion of a transmission, e.g., to increase decoding efficiency and minimize retransmissions. Block based coding may include mapping code blocks to a code block group. The mapping may be in frequency, in time, and/or in a combination of frequency and time. The mapping may be indicated in control information. For example, a wireless communications network may have a processor configured to determine the mapping and may transmit the mapping to a WTRU in a downlink control information. The WTRU may have a processor configured to monitor for DCI and receive the DCI, a downlink transmission with the code blocks, and attempt to decode the code blocks with the mapping received in the DCI.

HARQ feedback may be generated by HARQ processing, for example, based on the outcome of reception of a transmission for a (e.g., one) TB. For example, a WTRU may have a processor that is configured for HARQ feedback and may determine HARQ feedback based on attempting to decode the code blocks of the code block group using the mapping received on the DCI. The WTRU processor may be configured to send a NACK to the wireless communications network if the decoding is unsuccessful and an ACK if the coding is successful. The wireless communication network may have a processor that is configured to retransmit the mapping of the code block to the code block group if the processor determines that a NACK was received from the WTRU. In an example (e.g., when block-based coding is used), HARQ feedback may be generated at a higher granularity (e.g., per CB) at the expense of higher overhead (e.g., an increased number of feedback bits) for the transmission of such feedback.

Generation and transmission of HARQ-related feedback may be improved. Improvements may be useful, for example, when block-based encoding is used and/or when puncturing events may occur in the system.

Feedback procedures are applicable to many use cases, technologies and scenarios.

In an example, a first transmission may be initiated. The first transmission may be performed using at least a portion of physical layer resources. One or more resources may correspond to at least a portion of physical layer resources associated with a second transmission.

The first transmission may be, for example, a "puncturing" transmission, "interfering" transmission, "delay-sensitive" transmission or "mini-slot" transmission. The second transmission may be, for example, an "on-going" transmission, a "best-effort" transmission or "slot-based" transmission.

The first and second transmissions may be transmitted by the same entity or different entities. The first and second transmissions may be received by (or intended for) the same entity or different entities. The first and second transmissions may be a downlink or uplink transmissions that may be part of an infrastructure-based (e.g., cellular system) transmission. The first and second transmissions may be a direct WTRU-to-WTRU transmission (e.g., a sidelink-type of transmission).

An (e.g., each) entity may be part of, for example, a WTRU or a network infrastructure node.

Feedback procedures may be associated with specific aspects, procedures and/or components of radio access.

A WTRU may apply (e.g., have a processor that is configured with executable instructions for) a feedback procedure as a function of one or more of the following, for example: (i) numerology, Spectrum Operating Mode (SOM) and/or configuration thereof associated with a transmission, (e.g., a set or resources, carrier, subcarrier spacing, symbol duration, priority associated with specific data, TTI duration, framing (e.g., slot-based, mini-slot-based) or the like); (ii) physical layer resources associated with a transmission; (iii) control channel and/or one or more associated characteristics (e.g., RNTI, location in terms of search space, CCE or the like) associated with transmission and/or physical layer resources; (iv) received downlink control information, such as an explicit request for a specific method to be applied (e.g., no HARQ feedback), a first reporting method or a second reporting method; (v) reference and/or demodulation signals associated with a transmission; (vi) a configuration received by upper layers (e.g., a configured feedback and/or transmission mode); (vii) a configuration associated with one or more HARQ processes (e.g., including a set of processes), which may include an applicable soft-combining procedure (e.g., Incremental Redundancy or Chase Combining).

A (e.g., NR) system may support soft-combining for HARQ processes, which may include a plurality of procedures, such as Incremental Redundancy or Chase Combining. In an example (e.g., for a given HARQ process using incremental redundancy (IR)), a HARQ retransmission may be performed for a given TB using a different number of bits (TBS) relative to a previous transmission for the same TB. A different number of bits may be used, for example, given the manner in which soft-combining works with IR. This may be true for turbo coding (e.g., as may be used for LTE) or (variable-size) LDPC (e.g., as may be used for NR). WTRU buffering and processing may be higher for coding (UL) and soft-combining (DL). A HARQ retransmission with IR may have different values and/or combinations for one or more of a TTI duration, PRB allocation, MCS, etc. that may lead to the same or different TBS. In an example (e.g., for a given HARQ process using chase-combining), a (e.g., any) HARQ transmission associated with a HARQ process and the same TB may use the same number of bits (TBS). A scheduler may determine whether IR or chase-combining may be used and may determine a TTI (or whether the transmission is a slotted transmission or a mini-slot transmission) for a given HARQ process for a given TB. A WTRU may receive signaling to this effect and may make the appropriate determination for a (e.g., each) transmission. A WTRU may (e.g., accordingly) handle a HARQ processing timeline in terms of grant to UL transmission and in terms of HARQ feedback timeline.

Examples procedures are provided to generate receiver feedback information.

Different types of feedback may be generated at different times.

In an example, a WTRU may be configured (e.g., for downlink transmissions) to generate and/or transmit uplink control information as a function of the WTRU's configuration. A configuration may include a processor programmed with HARQ-related parameters, such as the type of soft-combining processing to apply, a HARQ operating point for a given HARQ process, one or more reference transmissions (e.g., for controlling the type of HARQ-related feedback of transmission(s) for the HARQ process) and/or feedback suppression parameters, such as one or more specific transmissions in a sequence associated with a given HARQ process or transport block (TB).

In an (e.g., alternative) example, HARQ-related parameters may be expressed in time (e.g., in terms of TTI(s)), in terms of scheduling occasions for the HARQ process or similar. HARQ-related feedback may, for example, refer to feedback that corresponds to a specific transmission associated with a HARQ process.

A target operating point may correspond to, for example, a target number $x_{target}$ of transmission(s) for a given HARQ process. A WTRU may be configured (e.g., a processor programmed with the configuration) to report specific HARQ-related feedback, for example, starting from a transmission that corresponds to a configured value. This type of feedback may correspond to, for example, DM-based feedback, CSI-based feedback, CB-based feedback or TB-based feedback.

Feedback-type control parameters may be provided (e.g., by the wireless communications network to the WTRU). One or more reference transmission(s) for a given HARQ process may correspond to a transmission $x_{i\_type}$ in a sequence. A WTRU may be configured (e.g., a processor programmed with the configuration) to enable and/or change the type of HARQ-related feedback generated for (or starting from) a downlink transmission $x_{i\_type}$ for a concerned HARQ process. A WTRU may be configured (e.g., a processor programmed with the configuration) to control switching the type of feedback transmitted by the WTRU from one type to another. Such types of feedback may correspond to, for example, DM-based feedback, CSI-based feedback, CB-based feedback or TB-based feedback.

Feedback suppression parameters may correspond to, for example, one or more values $x_{threshold}$ (e.g., from a set such as [1, 2, 3, infinite]). A value (e.g., 1, 2 or 3) may indicate that (e.g., for downlink transmissions) the WTRU may refrain from generating a HARQ-related feedback and/or reporting for the initial transmission (e.g., suppressing for up to the first transmission), the first retransmission or the second retransmission, respectively. An infinite value may indicate that the WTRU may (e.g., only) transmit HARQ-related feedback upon receiving (e.g., explicit) control signaling that requests such feedback. Suppression parameters may be associated with (e.g., all) types of feedback that may be applicable and/or configured for a concerned HARQ process or that may be applicable to a specific type thereof. Types of feedback may correspond to, for example, DM-based feedback, CSI-based feedback, CB-based feedback or TB-based feedback. The WTRU has a processor that is programmed to receive the feedback suppression parameters from a wireless communications network, to read the feedback suppression parameters, and determine to act in accordance with the received feedback suppression parameters. The wireless communications network may have one or more processors that are programmed to determine the feedback suppression parameters and transmit the parameters to the WTRU.

Configurations may have different granularities. A configuration may be different for uplink HARQ processing and downlink HARQ processing. HARQ processing may be specific to a given TrCH. HARQ processing may support transmissions according to different transmission durations (e.g., different numerologies), which may be generally referred to as TTI. A configuration may be in addition to other (e.g., legacy) parameters (e.g., maximum number of HARQ transmissions).

A WTRU may be configured (e.g., for downlink transmissions) (e.g., a processor programmed with the configuration) to generate and/or transmit uplink control information as a function of a HARQ process state. A state may correspond to an aspect, such as a sequence in a transmission for a HARQ process. A state may (e.g., also) correspond to timing aspects, such as a maximum time for a HARQ process to succeed, etc. A state may correspond to, for example, measured or estimated link quality, demodulation performance or number of codeblocks successfully decoded.

A WTRU may be configured (e.g., a processor programmed with the configuration) with a feedback method described herein for a subset of resources (e.g., and/or all resources) within a TB. For example, a WTRU may be configured with a set of suppression parameters. For example, one or more (e.g., each) individual suppression parameter(s) may be defined per sub-TB resource (e.g., per codeblock, or per set of codeblocks) and/or with different types of feedback for different sub-TB resources (e.g., for the same downlink (re)transmission). For example, a first set of sub-TB resources may be configured with DM-based feedback and another set of sub-TB resources may be configured with CB-based feedback. A WTRU may be configured (e.g., explicitly) (e.g., a processor programmed with the configuration) to report feedback for a specific subset of sub-TB resources. WTRU reporting may correspond to feedback (e.g., DM-based feedback, CSI-based feedback, and/or CB-based feedback as described further below).

A WTRU may expect (e.g., for uplink transmissions) reception of HARQ-related feedback, e.g., using a similar logic if feedback is expected. For example, a WTRU may determine (e.g., a processor may determine) a format, contents and/or type of feedback as a function of a logic similar to logic used to generate feedback for downlink transmissions.

Configuration may be received by the WTRU processor in downlink control signaling, which may permit dynamic control of HARQ processing related to feedback.

Feedback may be based on demodulation (DM) performance. For example, a WTRU processor may generate HARQ-related feedback based on a metric related to demodulation performance A WTRU may be configured (e.g., a processor programmed with the configuration) to generate HARQ-related feedback for physical transmission resources.

A set of physical resources associated with a transmission may be sub-divided, e.g., in terms of resource regions. A resource region may correspond to a subset of resources in time, in frequency and/or in space of resources allocated to the transmission. In an example, a resource region may correspond to a subset of one or more PRB(s) over specific symbols (or one or more portions thereof). For example, a resource region may correspond to a symbol (or portion thereof). A region may be (e.g., further) associated with one or more demodulation reference signals (DM-RS).

Different portions of a transmission (e.g., one or more codeblocks or a transport block) may be mapped to resource regions. A (e.g., each) portion may correspond to a specific region.

A WTRU may determine with a processor that a downlink transmission is scheduled using a specific resource allocation. A WTRU may perform, with a processor, one or more actions upon reception of a transmission.

For example (e.g., upon reception), a WTRU processor may determine region(s) a transmission may have been above a certain reception quality, which may be reported as a positive feedback or as a measurement value. A WTRU processor may determine what regions were otherwise, which may be reported as a negative feedback or as a measurement value. This may be based on, for example, SINR measurements, decoding of individual CBs or other metrics. A WTRU processor may make determinations based on, for example, relative DM-RS, signal strength, an estimation of how close the WTRU was from successfully decoding a portion of a transmission, based on individual (e.g., failed or successfully decoded) code blocks, etc.

For example (e.g., upon reception), a WTRU processor may determine that it failed to decode one or more (e.g., all) codeblocks that may be mapped on a resource region, which may be reported as a negative feedback. A WTRU processor may determine that it successfully decoded one or more (e.g., all) codeblocks mapped on a resource region, which may be reported as a positive feedback.

For example (e.g., upon reception), a WTRU processor may determine region(s) for which the transmission was above a certain reception quality. A region may correspond to a symbol. A symbol may be reported as bad quality or good quality, which may be computed as a function of SINR. Bad quality may be reported, for example, as a negative feedback or as a measurement value. Good quality may be reported, for example, as a positive feedback or as a measurement value.

A WTRU processor may report (e.g., to a wireless communications network) corresponding feedback for one or more regions. A WTRU processor may report measurement values for one or more regions (e.g., regions with insufficient quality or all regions). A WTRU processor may report (e.g., to a wireless communications network) ACK/NACK bits per region or similar. Reporting may be arranged by one or more procedures, e.g., as described herein.

In an example, a WTRU processor may (e.g., further) determine that more than x regions are of insufficient quality. A WTRU processor may report (e.g., to a wireless communications network) feedback as a single reporting for all regions. A WTRU may use a different reporting procedure (e.g., a TB-based procedure or a channel state indicator value). A WTRU processor may (e.g., alternatively) report (e.g., to a wireless communications network) more granularity. A network scheduler may (e.g., based on increased granularity) determine a resource allocation with a higher probability of successful decoding.

Reporting may be useful for ultra-low latency services, for example, given that demodulation-based measurements may be generated earlier than codeblock-based feedback or TB-based feedback. SINR measurement may (e.g., further) provide probabilistic information back to a transmitter (e.g., scheduler). A transmitter may perform more efficient retransmissions, for example, when operating below an intended operating point (e.g., early in a transmission cycle of a transport block).

Demodulation performance based feedback reporting may provide an indication to the scheduler of a WTRU's confidence for decoding a TB or a portion of a TB (e.g., sub-TB resource). The confidence (or likelihood or probability) of decoding (e.g., correctly decoding) may be fed back as a quantized value. For example, a WTRU processor may use x bits to report the demodulation performance based feedback. Each codepoint may correspond to a pre-defined confidence level.

Despite a high confidence of correctly decoding, a WTRU may be unable to decode the TB and/or sub-TB resources associated with the feedback reported. For example, it is possible that the scheduler, after having received an indication of a high decoding likelihood, may not include the TB and/or sub-TB resources in a future retransmission. The WTRU processor may determine to maintain the feedback state (e.g., which may now be an absolute NACK) and/or any stored soft data received. A WTRU may be indicated by the network to feedback HARQ values for TBs and/or sub-TB resources despite not having received any other (re)transmission since a previous feedback report. For example, a WTRU processor may receive a first transmission and may provide decoding confidence feedback for two sub-regions of a TB. The WTRU processor may determine that a first region has a high likelihood of decoding correctly and a second region has a low likelihood of decoding correctly. The indication that one region has a higher likelihood of being decoded correctly and a second region has a lower likelihood of being decoded correctly may trigger the scheduler to retransmit the data of the second region in a first retransmission and the data of the second region may not be included in the first retransmission. The WTRU processor may then determine that the WTRU cannot decode the first region correctly. A WTRU may be indicated by the wireless communications network to feedback a HARQ report for the first region (e.g., an absolute ACK/NACK type report) after the first retransmission, even though the first region itself might not have been included in the first retransmission.

The demodulation performance based feedback may be determined from measurements taken from a demodulation reference signal (DMRS), a channel state information reference signal (CSI-RS), other RS, and/or from measurements taken from the actual data transmission. A WTRU processor may be configured with an association between a reference measurement (or data measurement) resource and/or a HARQ feedback.

Feedback may be based on codeblock (CB) decoding. For example, a WTRU processor may be configured to generate HARQ-related feedback for a (e.g., each) codeblock (or group thereof).

A WTRU processor may determine that feedback may not be generated for one or more codeblocks (or resource regions), for example, based on signaling and/or determination that corresponding resources may experience interference (e.g., puncturing). This may be useful, for example, when a transmitter (e.g., scheduler) may be (e.g., is) aware of preemption, e.g., due to a first transmission of some resources allocated to a second resource. In an (e.g., another) example, a transmitter aware of an event may determine that feedback on preempted CBs may be neglected (e.g., applicable for puncturing) or enriched (e.g., applicable for superposition). A determination may be made by the WTRU processor, for example, as a function of whether a CRC may be included for a (e.g., each) codeblock. This may (e.g., implicitly) indicate to a receiver a change by dropping or masking the per-CB CRC, for example, when a transmitter inserts a CRC at the beginning of a (e.g., each) CB.

A WTRU processor may (e.g., in such a case) perform one or more of the following: (i) neglect feedback on punctured CBs and provide a single bit feedback for all remaining CBs; and (ii) provide enriched feedback per-CB (or group of CBs) for the indicated CBs and provide a single bit feedback for all remaining CBs (superposition).

Enriched feedback may provide an ACK/NACK indication that may be generated for a single CB or for a CB group (CBG). Grouping of CBs may be configured or indicated by control signaling. For example, grouping may be based on CBs mapping to different TBs in the same transmission, e.g., when TB multiplexing or multiplexing of CBs from different TBs may be supported. Toggling between enriched and single bit feedback may be configured per HARQ (re)transmission number for a specific HARQ process. Enriched/multi-bit feedback may determine NACKed CBs based on, for example, explicit indices (e.g., CBG indices and in between, CBG index plus offset, or Index of each CBG) and/or implicitly (e.g., based on feedback of an index of PRB, slot, mini-slot, or symbol). There may be a bit map of 1 A/N-bit per CBG. For example, a bundle size may be indicated by a prefix (e.g., a 2-bit prefix to map to four possible bundle sizes).

Feedback may be based on transport block (TB) decoding. A WTRU processor may be configured to generate HARQ-related feedback for a (e.g., each) TB.

A WTRU processor may be configured to generate HARQ-related feedback, for example, by combining two or more of the foregoing examples (and/or other examples) according to, for example, a HARQ process state and/or DCI request(s)). For example, a WTRU processor may generate different types of feedback: (i) for different HARQ entities (e.g., by configuration); (ii) for different HARQ processes (e.g., by dynamic control signaling, by applicable framing (e.g., slot or mini-slot)); (iii) for different uplink control channel (e.g., whether feedback may be on a common shared uplink control channel or on a dedicated transmission (with or without other data)); (iv) for different transmissions in a sequence of (re-)transmissions for a given HARQ process; and/or (v) as a function of an applicable soft-combining procedure for a HARQ process).

Procedures may provide for transmission of receiver feedback. A WTRU processor may be configured to report HARQ-related feedback in one of a number of payload arrangements. Feedback reporting procedures may be applied in conjunction with any of the feedback types described herein, e.g., for feedback related to link quality (DM-based feedback) and/or resource regions or codeblocks (CB-based feedback).

Additional information bits may be introduced, for example, using channel selection. Selection of one out of a set of $2^y$ possible uplink resources for transmission of feedback may provide y additional bits of feedback information. In an example, this may be used to indicate the type of reporting applicable.

Pattern based signaling (e.g., a compression procedure) may be supported and maybe based on, for example, CB, RE and/or PRB mapping. A WTRU processor may be configured with one or more set of elements. An element may be a resource (e.g., forming one or more resource regions) and/or codeblocks (e.g., forming one or more subsets, such as one per TB when TB multiplexing may be supported for a given transmission). Resource regions and sets of codeblocks may or may not map to each other.

A WTRU processor may be (e.g., further) configured with one or more patterns. A pattern may correspond to a group of one or more sets of elements. An element may be represented in one or more patterns. A (e.g., each) pattern may be associated with a codepoint or an identity.

For example, a WTRU processor may be configured with patterns. In an example, pattern 00 may represent elements 1, 3, 5 and 7 of a transmission (e.g., one element may be an indexed CB of the transmission or an indexed resource area of the resource allocation for the transmission). Pattern 10 may represent elements 0, 2, 4 and 6 of a transmission. Pattern 01 may represent elements 0-3 inclusively of a transmission. Pattern 11 may represent elements 4-7 inclusively of a transmission.

A Huffman-based coding may (e.g., also) be used, for example, when a variable number of bits may be reported. A 1-bit root indicator may indicate reporting for all elements of a reporting type (e.g., the entire TB for a single TB per transmission). A variable number of feedback bits may be supported, for example, when multiple formats may be defined for a given uplink control channel and/or when channel selection may be configured for transmission of uplink feedback.

The size, contents and number of patterns may (e.g., further) be a function of dynamic scheduling information (e.g., DCI). For example, the number of possible reporting patterns may be a function of resource allocation size, the number of codeblocks or similar. A determination may be based on a predetermined function.

A WTRU processor may generate HARQ-related feedback. A (e.g., each) pattern may indicate what is being reported or may (e.g., further implicitly) indicate positive or negative acknowledgement for the concerned elements of the reporting. In an example, a WTRU processor may determine a pattern to report in feedback, for example, by selecting a pattern that may minimize the number of unnecessary retransmissions (e.g., a pattern that may include all negatively acknowledged elements and the fewest possible positively acknowledgeable elements).

This may be efficient, for example, when network configured reporting for a WTRU with patterns may be based on a resource allocation strategy for puncturing events that may be coherent with such patterns. For example, a coherent pattern may include at least one pattern corresponding with (e.g., only) resources that may (e.g., would) be used for puncturing while the scheduler may schedule puncturing events using those resources (e.g., when necessary).

High rate channel state information may (e.g., also) be provided.

In an (e.g., another) example, a WTRU may receive downlink control signaling that may request feedback, for example, based on the indicated pattern (e.g., for the elements of the concerned pattern).

In an (e.g., another) example, a WTRU may receive downlink control signaling that may request retransmission including (e.g., only) elements of an indicated pattern, such as (e.g., only) the codeblocks of a concerned pattern for the applicable TBs. A WTRU processor may determine to (e.g., when multiplexing of CBs associated with different TBs is supported) include the elements, for example, when the transport block size indicated in the control signaling allows it. The same HARQ process may be used. CBs may (e.g., alternatively) belong to a different HARQ process, which may be indicated in received control signaling.

In an (e.g., another) example, CBs for retransmission may be (e.g., implicitly) derived based on, for example, the receiver indicating one or more of: (i) frequency domain parameters (e.g., index of PRB, a group of PRBs per one or more enriched FB procedures) and/or (ii) time domain parameters (e.g., index of slot, mini-slot, symbol). For example, a mini-slot indication may be used to notify a transmitter to retransmit all CBs mapped to scheduled resources used on the mini-slot.

A receiver may determine an index based on, for example, demodulation performance, RS measurements and/or (e.g., explicit) decoding of per-CB CRCs.

A WTRU processor may be configured to feedback HARQ reports for patterns (e.g., whole TB, sub-TB, group of CBs, single CB, etc.) and the reports and/or patterns may be independent of their presence in the associated (re) transmission. A WTRU processor may be configured to feedback HARQ reports for CBs (e.g., all CBS) of the original TB after an xth retransmission (e.g., when only a subset of CBs were included in the xth retransmission).

Signaling may be based on reception state (e.g., suppression procedure). At least N blocks may be decoded, e.g., to enable combinations.

For example, a WTRU processor may be configured or instructed to report that "at least N code blocks are decoded." This may be useful, for example, for a puncturing event, e.g., to determine whether code blocks known not to have been punctured may (e.g., should or must) be retransmitted. A scheduler may already know that punctured code blocks should be retransmitted. N may be a function of a total number of code blocks C (e.g., C−1).

Combinations of procedures may be provided, for example, based on HARQ process state and/or DCI requests.

A WTRU processor may indicate the resources associated with a feedback report.

A WTRU processor may be signaled to provide feedback for a group of sub-TB resources (e.g., pattern, group of CBs, etc.). A WTRU processor may determine a set of sub-TB resources to provide feedback resources (e.g., those for which the WTRU needs to provide feedback resources). For example, a WTRU processor may have provided confidence-based feedback in the past on some sub-TB resources and such feedback may or may not still be valid. The WTRU processor may determine whether or not to update the feedback report (e.g., depending on the feedback validity). A WTRU processor may include a resource identifier in the feedback report to indicate to the scheduler the purpose of a feedback report (e.g., each feedback report). For example, a WTRU may have transmitted confidence-based reports for a CB (e.g., each CB) after a transmission. A report may indicate a likelihood (e.g., strong likelihood) for correct decoding. A WTRU may be signaled to report feedback for some, or all, of the CBs for which it previously provided confidence-based reports. In the event that a WTRU processor successfully decoded CBs that a WTRU previously indicated it could successfully decode, the WTRU may determine to not provide an updated feedback. If the WTRU processor is unable to decode a CB that the WTRU previously indicated it could successfully decode, the WTRU processor may provide a CB identifier and a NACK value. A WTRU may be signaled to provide feedback for all correctly decoded sub-TB resources (e.g., regardless of whether the WTRU had already indicated ACK). A lack of an identifier of a sub-TB resource may be used as an indication of a NACK for that sub-TB resource. A WTRU may be signaled to provide feedback for a sub-TB resource whose HARQ ACK/NACK status has changed since a previous feedback report.

A WTRU processor may be configured to report, for example, according to a first reporting procedure for certain transmissions and according to one or more other reporting procedures for other transmissions, which may be for the same HARQ process and/or the same TB. This may be, for example, dynamically indicated in downlink control information and/or based on a configuration of a WTRU.

For example, a WTRU processor may be configured to report DM-based HARQ-related feedback for one or more initial transmissions of a HARQ process. This may be useful, for example, to provide additional channel state information. A WTRU processor may be (e.g., further) configured to report CB-based feedback, for example, when it determines that no more than a threshold x of CBs have not been successfully decoded. A WTRU processor may be configured to report a (e.g., single) HARQ ACK/NACK bit, for example, starting from another threshold (e.g., a configured operating point and above).

A WTRU processor may (e.g., alternatively) determine that a (e.g., single) bit for TB-based reporting may be sent, for example, when HARQ ACK may be applicable.

Figure 2:
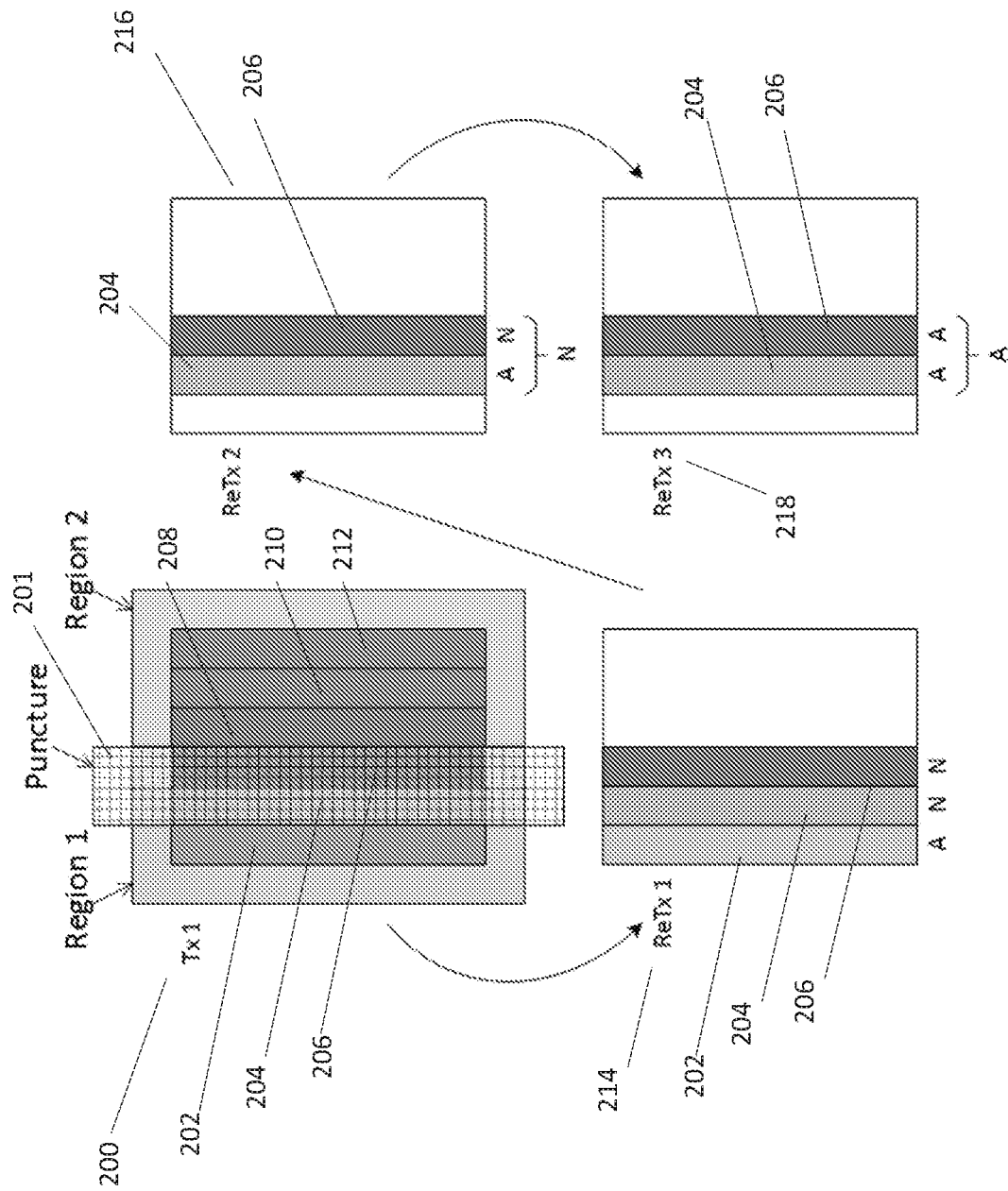
FIG. 2 is an example of a punctured transmission with a different HARQ feedback type per transmission.

FIG. 2 is an example of a transmission 200 that is punctured 201 due to an URLLC transmission and for which different HARQ feedback types are expected at each retransmission. Different CBs 202, 204, 206, 208, 210, 212 are shown in FIG. 2. During the first transmission 200, the second 204 and third 206 CBs are punctured to enable the transmission of URLLC (e.g., to another WTRU). The WTRU processor may be configured to report per-region feedback. The feedback may be confidence-based (e.g., DM-based) and/or absolute ACK/NACK based feedback. For example, a WTRU processor may feedback NACK for the first region and ACK for the second region. In the first retransmission 214, the WTRU processor receives the CBs (e.g., only the CBs) for which it fed back NACK. The WTRU processor may be configured to perform per-CB based feedback. The second 204 and third 206 CBs may have no combining gain (e.g., since they were punctured in the first transmission) and therefore decoding may fail. In the third retransmission 218, the second and third CBs are transmitted (e.g., only the second and third CBs). The WTRU processor may be configured to provide per-TB HARQ feedback (e.g., since per-CB feedback may use more resources and the gain associated with granular feedback may be limited given that the number (e.g., few) of CBs that are left to be retransmitted). The WTRU may have a second retransmission 216. After the third retransmission 218, a WTRU processor may provide feedback ACK for the TB (e.g., entire TB), and this may finish process. In this example, the first feedback may have utilized confidence-based feedback. A decoding confidence of the second region may have been deemed high, but that decoding may have failed, and the TB-based feedback of the second retransmission (216), may be configured for the entire TB, or for the sub-TB region for which there are still active retransmissions (e.g., and not for regions were there were no active retransmissions). The WTRU processor may be configured to provide feedback reports for previous confidence-based reports of different sub-TB regions (e.g., when only the sub-TB region for which there are still active retransmissions).

A WTRU processor may be configured to report feedback for a set of DL transmissions. The set of DL transmissions may include transport blocks transmitted on any combination of multiple component carriers (CCs), multiple bandwidth parts (BWP), multiple slots, multiple spatial layers, and/or multiple codewords. A WTRU (e.g., configured with multiple CCs) may have a large and varying amount of feedback to report at any time. Using a dynamic feedback codebook may reduce the overhead of a semi-static configuration. The amount of feedback can be very large if a transmission uses CBG segmentation and CBG feedback is utilized.

When determining feedback, a WTRU processor may determine whether the order in which Ack/Nack (A/N) values are assigned in the feedback payload matches that expected by the network. The DCI scheduling data may provide the WTRU information on the order of feedback bits within a feedback report. The DCI may include a feedback bit counter DAI (e.g., in place of or in addition to a counter Downlink Assignment Index (DAI), which may enable a WTRU to determine the order of the DL assignment in the total number of DL assignment the WTRU may receive). A DAI may indicate to the WTRU one or more of: (i) the number of bits required to provide feedback for a DL assignment; (ii) the bit placement in a feedback report where the HARQ A/N bits for the DL assignment should be located; and/or (iii) the total number of feedback bits to be included in the feedback report.

The number of bits required to provide feedback for a DL assignment may be indicated. For example, the feedback may be for CBG based feedback, and the WTRU processor may be configured with one or more feedback bit(s) per CBG. The number of bits may be fixed over the retransmissions of a TB (e.g., regardless of how many CBGs are in a specific retransmission); may depend on the number of CBGs present in a retransmission; and/or may indicate the number of feedback bits used per CBG feedback report.

The bit placement in a feedback report where the HARQ A/N bits for the DL assignment should be located may be indicated, for example a network entity may signal the bit placement information to the WTRU. For example, a first DL assignment may indicate to the WTRU that the placement of the feedback report may begin at bit '0'. A second DL assignment may indicate to the WTRU that the placement of its feedback report may begin at bit '5'. Such an indication may enable the WTRU to know how many bits it needs to NACK in the event it missed the first DL assignment DCI.

The total number of feedback bits to be included in the feedback report may be indicated (e.g., the size of the feedback payload). The WTRU processor may determine the size of the feedback of missed assignments and may adjust its payload to match the expected order at the network.

An example of a feedback-bit counter is a WTRU receiving a first assignment with feedback-bit counter=0 and information within the grant that the feedback report may be 4 bits. The WTRU may expect that if it receives a second DL assignment that it should have feedback-bit counter=4. If the WTRU instead receives a DL assignment with feedback-bit counter greater than 4 (e.g., x), the WTRU processor may determine that it missed an assignment and determine that the WTRU requires x−4 bits of feedback to be NACK to maintain the proper feedback report size.

The feedback-bit DAI may be indicated (e.g., explicitly). The feedback-bit DAI may be an index that points to a table of values that may be semi-statically provided to a WTRU.

The feedback-bit DAI may be used in addition to, or instead of, a counter DAI in a DL assignment DCI.

A WTRU processor may determine from a counter DAI that it is missing one or more assignments. The WTRU processor may transmit to the wireless communications network a set of bits indicating NACK for the maximum feedback size (or a configurable default size) that may have been required for the missed one or more assignments. This may lead to a mismatch at the network with the expected feedback size. The WTRU processor may indicate to the network that it missed one or more DL assignments and had to use padding. The WTRU may indicate padding by use of a bit flag. For example, the WTRU may transmit a single bit indicating if the feedback size of an assignment is obtained from the DCI (explicitly or implicitly) or if the feedback size is a default value due to not receiving the DL assignment.

A WTRU may miss a last DL assignment (or a set of last assignments). There may not be a starting position of a next set of feedback bits. The WTRU processor may not know the number of bits to NACK. The WTRU processor may use the largest feedback size (or a configurable size). The WTRU processor may indicate the use of padding to the network (e.g., using a flag). The WTRU processor may use multiple bits to indicate the amount of padding.

A WTRU processor may use a DAI counter when scheduled with data using a mix of slots and mini-slots. A WTRU processor may be scheduled with data transmissions on regular slots, mini-slots (e.g., of varying size), and aggregated slots. The transmission duration may be semi-statically configured per component carrier (or per BWP of a component carrier). The transmission duration may change dynamically (e.g., for transmissions within one component carrier or one BWP of a component carrier).

A counter DAI or feedback-bit DAI may be incremented in any order of BWP, CC, time, and/or codeword. For example, the counter DAI or feedback-bit DAI may be incremented in BWP first, CC second, and time third. BWP and CCs may be ordered by use of an index. The DAI may be incremented over the assignments in the BWPs of a first CC, BWPs of a second CC and so on, and moved on to the next slot and repeated in BWP/CC.

For cases where different BWPs and/or CCs use different slot lengths or numerology, the incrementing may follow the same rules. For some time instances, some BWPs and/or CCs may have scheduling occasions. The DAI incrementing may be over BWPs of a CC and over time scheduling occasions (e.g., slots, mini-slots, symbols) of a subframe. The DAI incrementing may be over the BWPs of a second CC and over time scheduling occasions (e.g., slots, mini-slots, symbols) of a subframe, and so on.

Bundling of HARQ feedback may be used to reduce or fix the size of a feedback for one or more DL assignments. Bundling may refer to combining (e.g., adding) feedback bits together to reduce the total amount of feedback bits. Examples of bundling may include one or more of: (i) CBG feedback bits may be bundled (e.g., feedback bit(s) of sets of CBGs within one or more TBs may be combined together); (ii) feedback bits for multiple BWPs of a CC may be bundled together; (iii) feedback bits for multiple CCs may be bundled together (e.g., DL assignments scheduled in the same slot of different CCs may have bundled feedback); (iv) feedback bits for multiple slots or mini-slots may be bundled together (e.g., feedback bits of assignments in slots/mini-slots within a subframe may be bundled together); (v) feedback bits for multiple spatial layers may be bundled together (e.g., spatial bundling) (e.g., a spatial layer may use CBG based feedback with for example the number of CBGs per layer being fixed and the spatial bundling being achieved by bundling the feedback of a first CBG of a first layer with the feedback of a first CBG of a second layer and so on, and bundling the feedback of a second CBG of the first layer with the feedback of a second CBG of the second layer and so on, which may continue for CBGs of the TBs in the same slot/mini-slot); (vi) feedback bits for multiple DL assignments on a same beam may be bundled together; and/or (vii) feedback bits for DL assignments of a same service (e.g., eMBB, URLLC, mMTC) may be bundled together.

Bundling rules may be configured (e.g., in order to ensure that a feedback bit string for a DL assignment may be kept at a default and/or a configurable value). Keeping a fixed value for the feedback of a DL assignment may ensure that there is no ambiguity between what the WTRU intended to transmit and what the network thinks it received as a feedback report even if some DL assignments are missed. The fixed feedback value per DL assignment may be less than the maximum value, in which case bundling may be used. A WTRU processor may be configured with a bundling method as described herein to achieve the appropriate feedback value. The feedback bits required for some DL assignments may be less than the fixed value. The WTRU may use repetition of the feedback or may use padding to achieve the fixed feedback bit string value.

The fixed feedback string value per DL assignment may be dependent on one or more of: (i) the PUCCH resource used to transmit the feedback (e.g., the PUCCH format, e.g., feedback using short PUCCH may use a first value and feedback using a long PUCCH may use a second value); (ii) a parameter of the data being transmitted (e.g., URLLC data may have a first feedback bit string value and eMBB may have a second value and/or the numerology configured for a CC or BWP may determine the feedback bit string value); (iii) the number of configured and/or activated CCs or BWPs, and/or BWPs per CC; and/or (iv) the number of slots, mini-slots or subframes for which feedback is reported in a single report.

Feedback may have unequal reliability. A WTRU processor may report feedback to the wireless communications network for two types of service in one feedback reporting instance. For example, a WTRU may be configured with URLLC data on a first CC and eMBB data on a second CC. A WTRU processor may use a single UL channel for feedback reporting. The required reliability of a component of the feedback report may vary. The WTRU processor may transmit the feedback report in a manner that may achieve the most stringent reliability needs of the multiple services. For example, the power setting, the multiplexing, and/or parameters of the PUCCH resource (e.g., diversity capability) may be selected to ensure that the entire feedback report achieves the requirements of the most sensitive feedback.

Unequal error protection for the feedback report may be used. For example, the feedback bits of a feedback report may be segregated into groups of similar reliability requirements. The feedback bits may be mapped to a specific set of resources of the feedback report—where a set of resources may achieve different reliability (e.g., depending on the reliability requirement of a feedback group). For example, a PUCCH may occupy multiple OFDM symbols, and some symbols may be transmitted with greater power than others. The feedback bits requiring greater reliability may be mapped to resources in symbols with greater transmission power. Feedback that requires higher reliability may be repeated over multiple resources within a PUCCH resource (e.g., in multiple hops of a PUCCH resource). Feedback that requires lower reliability may not be repeated over multiple resources within a PUCCH resource.

Feedback resource selection may be used. There may be a collision of feedback reports for different DL assignments with different requirements. Feedback for URLLC may use a first set of PUCCH parameters and feedback for eMBB may use a second set of PUCCH parameters. The multiple feedback reports may be multiplexed into a single feedback report. The WTRU may be configured with rules to determine the appropriate PUCCH resources to use for providing multiplexed feedback reports. For example, the WTRU may use the PUCCH resources tied to any of the DL assignments multiplexed in the feedback report and/or the WTRU may use a different PUCCH resource to transmit a multiplexed feedback report.

All or a subset of the feedback reports may be multiplexed into a single feedback report. For example, a subset of the feedback reports may be multiplexed in situations where the resources utilized to reliably transmit URLLC traffic feedback reports may be too great such that not enough resources are available to enable the multiplexing of eMBB traffic feedback reports. The WTRU processor may be configured with priority rules to determine what feedback may be included in a feedback report.

The WTRU processor may use the PUCCH resource indicated in a DL assignment (e.g., the last received DL assignment). For example, the WTRU may use the PUCCH resource indicated in a DL assignment if the WTRU is multiplexing feedback reports for multiple DL assignments in time.

The WTRU processor may determine the number of information bits (e.g., for the purpose of setting transmission power of the report).

The WTRU processor may determine a number of HARQ-ACK information bits (e.g., for the purpose of setting the transmission power of the PUCCH transmission carrying the report and/or determining a number of modulation symbols carrying HARQ-ACK information that may possibly be multiplexed with data in a PUSCH transmission. The number of bits may be used as an input to formulas for power control for PUCCHs or for multiplexing in PUSCH.

A transmission (PUCCH or PUSCH) may be configured to contain HARQ-ACK information at a CBG-level and/or a TB-level for at least one PDSCH transmission. The at least one PDSCH transmission may be mapped on at least one resource defined at least in part by carrier, serving cell, bandwidth part, slot, and/or mini-slot. For example, a WTRU may be configured to report a HARQ-ACK pertaining to two PDSCH in two carriers (or serving cells) or in two slots. A PDSCH may be configured to contain data from at least one TB.

A WTRU may be indicated in downlink control information (DCI) whether to report CBG-level and/or TB-level HARQ (e.g., for TBs of a given PDSCH transmission). The WTRU processor or network may encode this information by a sequence of bits of the same value (e.g., 0 or 1) where the length of the sequence may correspond to a number of CBGs or a maximum number of CBGs for the transport block, which may be configured by higher layers. The WTRU processor and the network may determine to use a consistent codebook size. For example, when the WTRU detects that a DL assignment is missing (e.g., using counter DAI or other technique), the WTRU processor may include the same number of bits regardless of whether a CBG-level or a TB-level feedback is expected. For the purpose of counting the number of HARQ-ACK information bits, the WTRU processor may: (i) count a single (1) HARQ-ACK information bit for a TB of a received PDSCH for which a TB-level HARQ-ACK should be provided based on an indication from DCI or a higher layer configuration; (ii) count a single (1) HARQ-ACK information bit for a TB of a PDSCH that is detected to be missing (e.g., using counter DAI or other technique) and for which TB-level HARQ-ACK should be provided (e.g., irrespective of indication from DCI) based on higher layer configuration; (iii) determine the number of TBs for a PDSCH based on configuration (e.g., based on whether spatial multiplexing is configured for this PDSCH); (iv) count NCBG HARQ-ACK information bits for a TB of a received PDSCH for which a CBG-level HARQ-ACK should be provided, based on an indication from DCI or higher layer configuration (e.g., where NCBG may be a configured number of CBGs for this PDSCH); (v) count NCBG HARQ-ACK information bits for a TB of a PDSCH that is detected to be missing (e.g., using counter DAI or other technique) and for which CBG-level should be provided based on higher layer configuration; and/or (vi) count NCBG HARQ-ACK information bits for a TB of a PDSCH that is detected to be missing (e.g., using counter DAI or other method) and for which the WTRU is configured to determine whether a CBG-level or a TB-level is used based on an indication in the DCI). The WTRU may employ sufficient but not excessive transmission power (or resource elements) for a transmission including HARQ-ACK for multiple PDSCHs that may be at a TB-level or a CBG-level, even if the same codebook size is utilized.

A WTRU processor may be configured to report sub-TB HARQ feedback. Such reporting may enable the scheduler to not repeat transmission of correctly decoded sub-TB resources (e.g., CBs). This may limit system interference and/or increase the spectral efficiency.

A retransmission may include a subset of the sub-TB resources (e.g., a subset of the original CBs). The remaining CBs may be mapped to assigned resources in a manner similar to the first transmission. For example, in FIG. 2 in the retransmissions, the CBs may be mapped to the same set of resource elements. The remaining resources may remain unused (e.g., blanked).

The remaining CBs may be concatenated and transmitted in adjacent resources of the assigned resource block. For example, where CB2 and CB4 of a TB are retransmitted, they may be mapped in adjacent resources (e.g., in the first OFDM symbols of the assigned resources). The mapping of each CB or of the concatenated remaining CBs may be explicitly indicated in the assignment for the retransmission.

A WTRU processor may determine a modulation and coding scheme (MCS) for a retransmission (e.g., a new MCS as compared to a previous transmission and/or previous retransmission). For example, a WTRU processor may obtain an MCS for transmission for using a greater number of resources per retransmitted CBG. A WTRU processor may obtain the MCS from the downlink assignment for CBG retransmission. A WTRU may be configured with a mapping function for MCS based on one or more of the number of CBGs retransmitted, the original (or previous) number of CBGs transmitted, and/or the original MCS.

The transmit power used for a retransmission of CBGs may be different from a previous transmission. For example, a change in transmit power may be beneficial to system interference and applicable to cases where the MCS has changed. A WTRU processor may determine that there was a change in transmit power for the retransmission, for example based on an indication explicitly included downlink assignment and/or implicitly based on the downlink assignment. For example, the WTRU processor may receive an indication from the gNB of a change in relationship between the power of a demodulation reference signal and the data.

The CBGs of a TB may be indexed. In a retransmission, the retransmitted CBGs may be ordered by increasing or decreasing index and may be placed adjacent to one another. This may enable non-punctured retransmission of data. If the resource allocation of the retransmission is the same as the previous transmission or retransmission (which may have had a greater number of CBGs), there may be a mismatch between the required number of resource elements and those available in the resource allocation. The resource allocation can be adjusted based on the number of CBGs being retransmitted. For example, a WTRU may be configured with a different (possibly smaller) set of PRBs for the retransmission, for example is a subset of the originally transmitted CBGs are being retransmitted.

Codeblocks (CB) or CBGs may be defined per symbol or sets thereof. For example, CBG mapping may be performed first in the frequency domain and second in the time domain (e.g., a frequency first mapping). For example, a resource allocation may span 7 symbols (e.g., in time) and each of 7

CBs or CBGs may span each of the subcarriers utilized for a unique symbol (e.g., a first CB/CBG is transmitted in the first symbol, a second CB/CBG, in the second symbol, etc.). A transmission may be configured such that none of the codeblocks/CBGs may span multiple symbols, and each symbol may include one or more codeblocks/CBGs (e.g., each symbol can have an integer number of codeblocks/CBGs). This may attempt to ensure interference events that occur on integer number of symbols do not have a negative effect on codeblocks transmitted in adjacent symbols. The size of a codeblock may be dependent on the frequency span of the resource allocation. In a retransmission using a reduced resource allocation, a codeblock or CBG of the first transmission may be allowed to span multiple symbols. The WTRU may be configured to expect a re-segmentation of the transmitted CBGs (and/or CBs) into (e.g., new) sets of CBGs (and/or CBs). For example, in a first transmission, a first codeblock may occupy the entire transmission bandwidth in a first symbol. In a retransmission over a reduced number of PRBs, the codeblock may now span two symbols. The codeblock may be segmented into two smaller codeblocks, each spanning the frequency allocation of a single symbol. The codeblock segmentation may be considered when the WTRU feeds back HARQ A/N for the retransmission. For example, the HARQ A/N may be common feedback for both of the new codeblocks and/or separate HARQ A/N feedback may be sent for each of the new codeblocks.

The number of CBGs and/or CBs-per-CBG along with resource mapping of the CBs/CBGs may depend on an allocation (e.g., size of frequency allocation, slot size, etc.), possibly along with some rules. The rules may be fixed or configurable by network (and/or a combination of fixed and configurable). The number of CBGs may be obtained as a one-to-one mapping with the number of symbols in an allocation. For example, a WTRU scheduled with data over a slot size of x symbols may assume y CBGs, where y=fct(x). For example, y=x, and each symbol is used for a single CBG. The number of CBGs may depend on the total number of subcarriers z. For example, a CBG may be composed of less than or all of the resource elements of a symbol if the number of subcarriers z is greater than a threshold. If z is less than a threshold, a CBG may span multiple symbols. It may be beneficial for a CBG to span as few symbols as possible, for example, when interference may be bursty in a time domain but not in a frequency domain. For example, the number of symbols spanned by a CBG, defined as s, may be obtained as s=floor(minimum_CBG_length/z), where minimum_CBG_length may be fixed or configurable. In some cases, a frequency allocation z may be greater than a second threshold (e.g., t2) and in such a case, multiple CBGs may be mapped to a single symbol. The total number of subcarriers z may be divided evenly over a number of CBGs. In an example, the CBG mapping over a symbol may be done in a manner such that as many CBGs as possible use maximum CBG length (e.g., t2). The number of CBGs per symbol y_s may be determined by y_s=ceiling(z/t2).

The CB mapping may be similar to CBG mapping, for example, in the case where a CBG is composed of a single CB. The CB to CBG mapping may be obtained as a function of the number of subcarriers and/or OFDM symbols assigned to each CBG. For example, the number of CBs in a CBG may be obtained as a function of the number of resource elements assigned to the CBG (e.g., total number of subcarriers multiplied by the number of OFDM symbols, for example if the assignment is contiguous in time and frequency). The resource elements assigned to a CBG may be divided evenly over a fixed number of CBs, or may be computed in a manner to allow the maximum number of CBs to have maximum length. For example, the number of CBs in a CBG, n, may be determined from the maximum CB length (max_CB_length) and the total number of resource elements in a CBG, w, such that n=ceiling(w/max_CB_length).

In an example, a TB may be divided into CBs in a manner such that most CBs may be of max CB length. The set of CBs may then be grouped into CBGs. The grouping may be done in a manner to reduce the number of symbols spanned by a CBG. For example, the CB-to-RE mapping and the CB-to-CBG mapping may be done in frequency first and then in time (e.g., first across the subcarriers of a first symbol, then across the subcarriers of a second symbol, etc.). A CB mapped to multiple symbols may be grouped within a CBG if the CBG doesn't already include another CB mapped to multiple symbols.

In an example, a CBG may span several symbols in the time domain while occupying a more limited bandwidth in the frequency domain. This scenario may occur, for example, when (i) interference may (e.g. be expected to) span a bandwidth that may be smaller than a bandwidth that may be allocated for a transmission and/or (ii) multiple pre-empting transmissions (e.g. of limited bandwidth and limited duration(s)) may occur or be occurring. A scheduler may (e.g. in the latter case) have an option to allocate multiple pre-empting transmissions in resources that may be occupied by a (e.g. single) CBG, which may minimize a (e.g. required) number of CBGs to be retransmitted. Examples mappings are illustrated in FIGS. 3 and 4.

Figure 3:
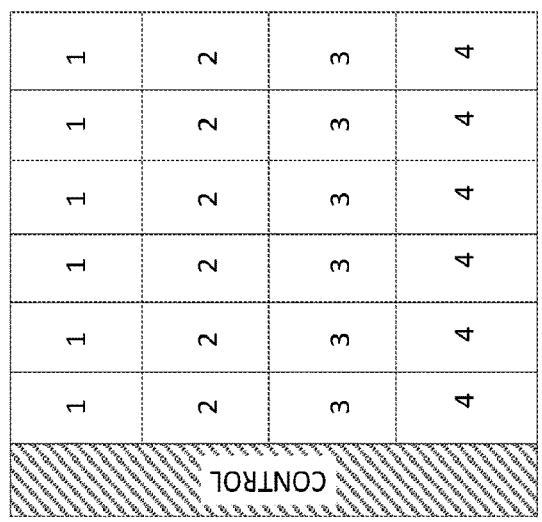
FIG. 3 is an example of a CBG spanning multiple CBs in the time domain.

FIG. 3 is an example of a CBG spanning multiple CBs in the time domain. In an example (e.g. as shown in FIG. 3), the number of CBs spanned by a CBG in the frequency domain may be F=1.

Figure 4:
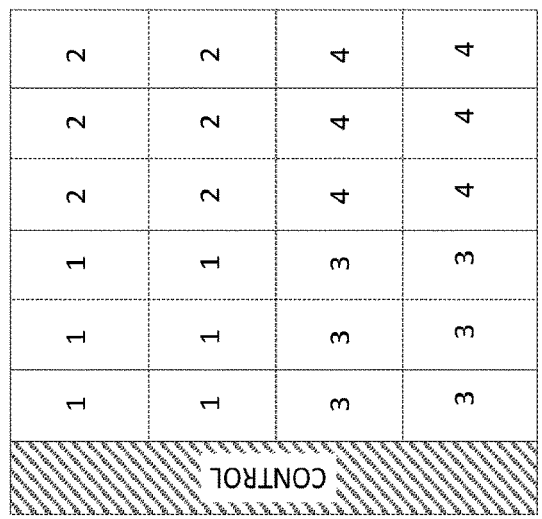
FIG. 4 is an example of a CBG spanning multiple CBs in the time domain.

FIG. 4 is an example of a CBG spanning multiple CBs in the time domain. In an example (e.g. as shown in FIG. 3), the number of CBs spanned by a CBG in the frequency domain may be F=2.

A WTRU processor may derive a CB-to-CBG mapping based on, for example, one or more of the following parameters: (i) a number of CBs that a CBG may span in the frequency domain (F); (ii) a number of CBs that a CBG may span in the time domain; (iii) a number of CBGs for a transmission; (iv) a number of CBs in a transmission; (v) a number of time symbols and/or resource blocks that may be occupied by a transmission; (vi) a number of time symbols and/or resource blocks that may be occupied by a CB; (vii) a number of time symbols and/or resource blocks that may be occupied by a potential pre-empting transmission or interference, such as a mini-slot duration; and/or (viii) one or more sets of time symbols and/or resource blocks that may correspond to a time and/or frequency allocation of a potential pre-empting transmission or interference (e.g. a set of symbol indices that may correspond to a potential start of a pre-empting transmission).

An optimum procedure to map CB to CBG may change depending on, for example, interference and channel conditions, a probability of pre-empting transmissions occurring and the like. A mapping may be determined using, for example, one or more of the foregoing parameters and/or other parameters. Parameters may be configured, for example, by higher layers. Parameters may be specific to a transmission profile that may be associated with a transmission. One or more parameters may (e.g. also) be indicated in a field of a DCI that may be associated with a transmission, for example, to allow for more dynamic adaptation of a mapping to channel and traffic conditions.

Non-uniform CB-to-CBG mapping may be provided. In an example, a CB-to-CBG mapping may be configured so that a number of CBs per CBG may be significantly smaller for one or more CBGs than others. Such CBGs may be referred to, for example, as "under-loaded" CBGs. In an example (e.g. when a pre-empting transmission may need to be scheduled), a scheduler may prefer to pre-empt resources that may be occupied by code blocks of under-loaded CBGs and may prefer to avoid pre-empting resources that may be occupied by code blocks of other CBGs. This approach may minimize the number of CBs that may need to be retransmitted in case pre-emption occurs. Under-loaded CBGs and/or CBs that may be mapped to under-loaded CBGs may occupy resources that may be spread in the time domain, for example, to maximize the chance that a scheduler may find resources that may be occupied by under-loaded CBGs (e.g. irrespective of the timing of a pre-empting transmission). An example is illustrated in FIG. 5.

Figure 5:
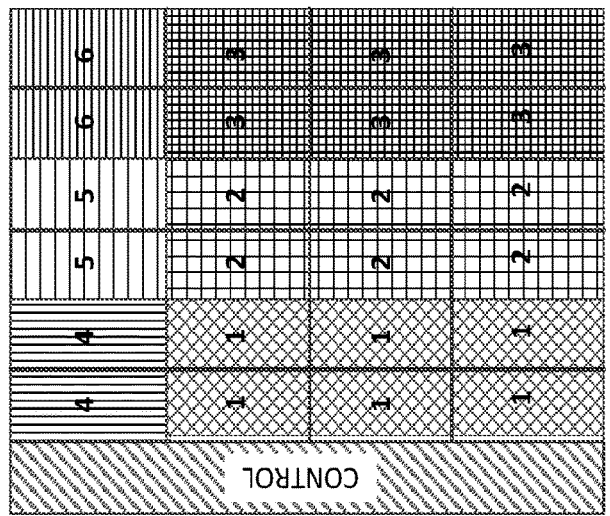
FIG. 5 is an example of non-uniform CB-to-CBG mapping allowing minimization of retransmitted CBs in case of pre-emption.
Figure 5A:
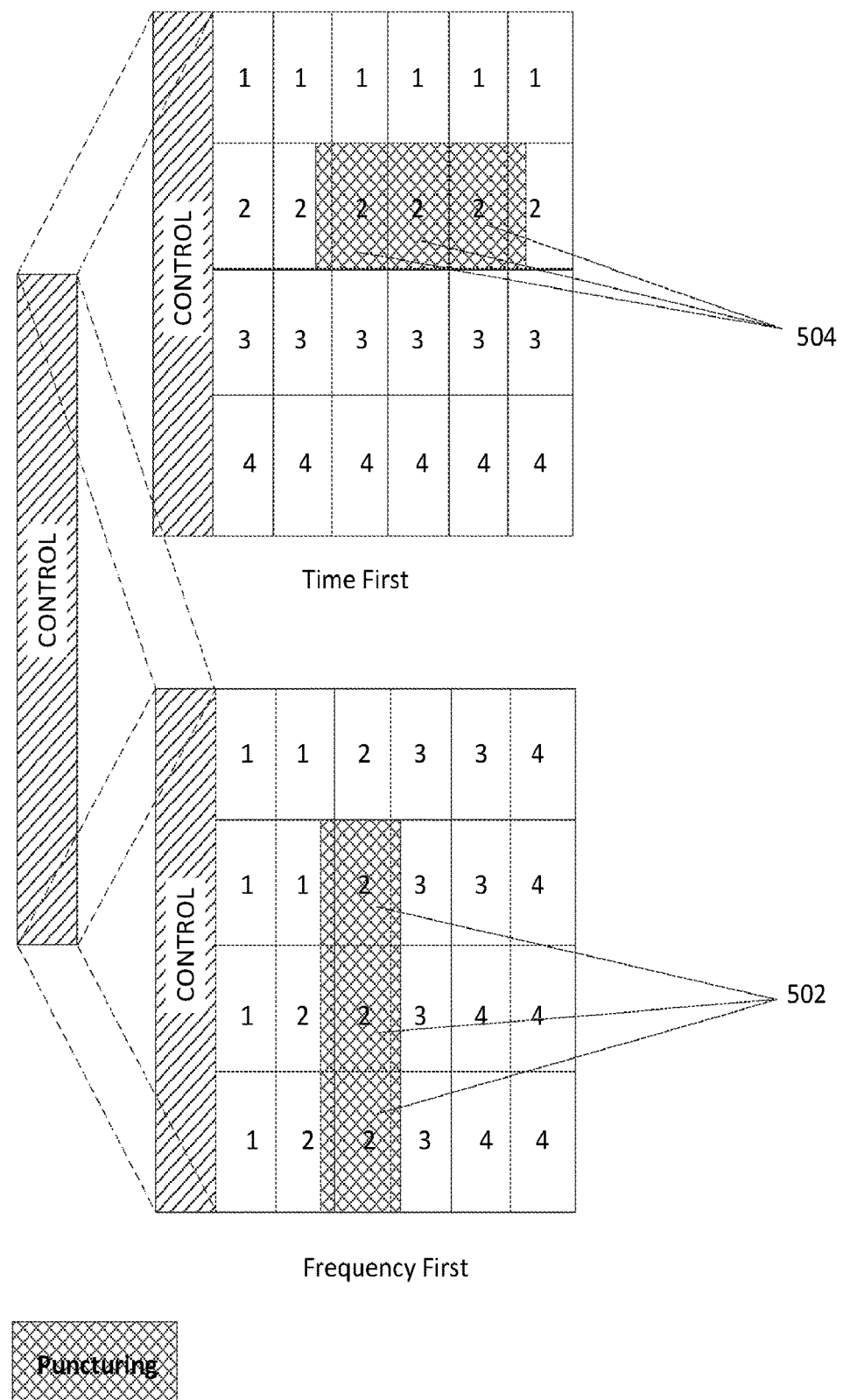
FIG. 5A is an example of frequency-first and time-first CB-CBG mapping.

FIG. 5A is an example of time and frequency mapping of code blocks to code block groups. FIG. 5A shows an example of a time first and a frequency first mapping of code blocks to code block groups. The mapping of code blocks to code block groups may be determined based on the expected interference or puncturing of a transmission. For example, if interference or puncturing is expected to span a limited region in the frequency domain, then the code blocks of a transmission can be mapped to a code block group in a frequency-first manner. An example of frequency-first mapping is shown in FIG. 5A and is labeled "frequency first." In the frequency-first example, interference is expected for frequencies associated with the shaded code blocks (502) and the code blocks are mapped to a code block group based on frequency. In another example, if interference or puncturing is expected to span a limited region in the time domain, then the code blocks of a transmission can be mapped to a code block group in a time-first manner. An example of time-first mapping is shown in FIG. 5A and is labeled "time first." In the time-first example, interference is expected for the shaded code blocks (504) and the code blocks are mapped to a code block group based on time. The type of code block to code block group mapping may be indicated in the downlink control indication (DCI). The type of code block to code block group mapping may be changed to adapt to changing interference conditions and the expected type of interference.

FIG. 5 is an example of non-uniform CB-to-CBG mapping allowing minimization of retransmitted CBs in case of pre-emption. In an example, a (e.g., each) rectangle may represent a CB. CBGs #4, #5 and #6 may be under-loaded. In an example, high-priority traffic may need to be scheduled over a mini-slot of 2 symbols. A scheduler may elect to schedule a transmission over the resources of CBG #4, #5 or #6, for example, depending on the timing of the high priority transmission. In an example, only 2 CBs may need to be 9, e.g., subsequently) retransmitted for the TB.

A WTRU processor may be configured, for example, with one or more of the following parameters (e.g., to determine a proper mapping): (i) a target number of CBs for under-loaded CBGs; (ii) a target number of CBs for normal (not under-loaded) CBGs and/or (iii) an indication of CBs to be mapped to under-loaded CBGs. An indication may, for example, consist of a set of resources (e.g., in frequency and/or time domain) that may be allocated to CBs. An indication may, for example, consist of an explicit list of CBs. An indication may, for example, consist of at least one parameter that may be used in a formula from which a mapping of CBs to CBGs for normal and under-loaded CBGs may be derived.

A CB to CBG mapping indication may be provided. A WTRU processor may be configured with multiple CBs-to-CBG mappings (e.g., uniform and non-uniform). A WTRU processor may determine which mapping may (e.g., should) be used, for example, upon receiving an indication from a network.

An explicit indication may be provided by the wireless communications network to the WTRU. In an example, a WTRU processor may receive an explicit indication that may point to a (e.g., one) configured mapping. An indication may be transmitted, for example, using DCI signaling. An indication may be transmitted, for example, at the beginning of slot/mini-slot. A DCI may be common (e.g. group common PDCCH or within group common search space) or WTRU-specific.

An implicit indication may be provided. In an example, a gNB may, for example, implicitly indicate a CBs-to-CBG mapping. A gNB may provide, for example, a pre-emption indication, an indication of potential pre-emption resources and/or a time pattern indication.

In an example of a pre-emption indication, a WTRU may receive information about frequency/time resources being pre-empted. A WTRU may group CBs according to an indication. In an example of a WTRU that may be configured with 2 CBGs, the WTRU may map CBs uniformly to CBGs, for example, when the WTRU may not receive a pre-emption indication. A WTRU may receive a pre-emption indication. A WTRU may (e.g. according to a pre-emption indication) map CBs within frequency/time resources that may be pre-empted to a first CBG and remaining CBs to a second CBG.

In an example of an indication of potential pre-emption resources, a WTRU processor may be configured (e.g. by an indication) with (e.g. potential) resources to be used for pre-emption. A WTRU may map CBs within indicated resources into separate CBG(s). In an example, a WTRU processor may be configured with K potential resources for pre-emption and N CBGs, where K may be less than N (e.g. K<N). The first K CBGs may, for example, be formed from CBs that may correspond to K potential resources, respectively. The remaining (e.g. N–K) CBGs may be formed, for example, uniformly from other CBs.

In an example of a time pattern indication, a WTRU processor may apply a (e.g. one) configured mapping according to a time pattern. In an example of a "poor" channel that may be correlated in time, CBs of bad channel condition may be grouped into a (e.g., one) CBG while remaining CBs may be grouped (e.g., uniformly) in other CBGs.

Minislots for sub-TB retransmissions may be used. The size of a slot can be adjusted based on the number of retransmitted CBGs. A WTRU processor may receive from the wireless communications network a DCI for a retransmission that indicates the slot size for a retransmission. A WTRU processor may implicitly determine the slot size (or the transmission time interval) when it receives a DCI that indicates the CBGs for the retransmission (UL or DL) (e.g., if the WTRU is configured such that the CBs or CBGs are each mapped to single, possibly consecutive, symbols). A WTRU may expect the PDSCH and RS mapping to follow rules configured for the minislot (e.g., rather than that of a slot size used for a previous (re)transmission). For example, the way in which the PDSCH and/or RSs are mapped to resource elements may be dependent on whether the WTRU is using a minislot and/or the length of the minislot.

A WTRU processor may be configured with DL control channel occasions to monitor for scheduling assignments (e.g., DCI). For example, a WTRU may be configured with DL control channel occasions that occur periodically, possibly tied to a fixed slot size (e.g., regular slot size). For the efficient use of mini slots for retransmissions, it may be beneficial to have a multiple WTRUs scheduled with sub-TB retransmissions in adjacent mini-slots. A WTRU processor may be indicated by the wireless communications network in a DCI for a retransmission, an offset in terms of symbols (or mini-slots) between the DCI and the data. For example, a WTRU processor may be scheduled in its regular DL control channel occasion (e.g., at the beginning of a regular slot) for a transmission that may be of shorter duration. Another WTRU processor may also be scheduled in its regular DL control channel occasion, however, that WTRU may be indicated a symbol offset for the beginning of its DL assignment for a sub-TB retransmission.

A WTRU processor may be configured with a first set of DL control channel occasions for scheduling of first transmissions and/or full TB retransmissions, and a second set of DL control channel occasions for scheduling of sub-TB retransmissions. The second set of DL control channel occasions may enable minislot scheduling with a greater number of possible starting symbols.

For power saving, the WTRU processor may monitor (e.g., only) the first set of DL control channel occasions, until either indicated to monitor the second set or autonomously determining to monitor the second set. For example, a WTRU processor may be informed by the wireless communications network in a DCI in a first DL control channel occasion to begin monitoring a second set of DL control channel occasions. In an example, a WTRU may begin monitoring the second set of DL control channel occasions upon reception of a pre-emption indication from the gNB. The pre-emption indication may be received by the WTRU in a DL control channel occasion of the first set, possibly in the next DL control channel occasion occurring immediately after the pre-emption has occurred. The first DL channel occasion of the second set that a WTRU processor may monitor, may be the first occurring after the reception of the pre-emption indication, or may occur at a (e.g., configurable) time offset from the reception of the pre-emption indication. In an example of a WTRU autonomous determination, the WTRU, upon feeding back sub-TB HARQ with a mix of ACKs and NACKs, may begin monitoring a second set of DL control channel occasions. For example, if the WTRU feeds back ACK for a subset of CBGs (e.g., some CBGs are NACKed), the WTRU processor may begin monitoring the second set of DL control channel occasions (e.g., in order to enable minislot scheduling of CBG retransmissions). A WTRU may monitor the second set of DL control channel occasions until indicated to stop by the gNB. The WTRU may monitor the second set of DL control channel occasions until the retransmissions of the one or many HARQ process(es) that triggered the monitoring are complete.

The second set of DL control channel occasions may be differentiated from the first set by one or more of: (i) different occasions in time (e.g., different symbol location within a timeline, or different location within a subframe); (ii) different location in frequency; (iii) different control resource set (CORESET); (iv) different subset of search spaces within a CORESET; and/or (v) different beam. For example, a WTRU may receive a first transmission on a first beam and any retransmission on a second beam (e.g., a beam with a narrower beamwidth).

Upon being indicated or autonomously determining to switch to a second set of DL control channel occasions, a WTRU may expect any downlink assignment (for first transmissions or retransmissions) to be transmitted within that set. For example, a second set of DL control channel occasions may be a superset including the first set of DL control channel occasions. The WTRU processor may be configured to keep the total number of blind decoding attempts per time period fixed. Upon increasing the DL control channel occasions in time, the WTRU may reduce them in frequency, CORESET, and/or search spaces.

After concatenating and mapping the CBs to a smaller set of symbols, the scheduler may leave the remaining resources unused (e.g., blanked). The scheduler may adapt the slot size to the number of CBs to be retransmitted. The scheduler may limit the number of unused resources, and this may increase spectral efficiency.

The scheduler may include a new TB (or a set of sub-TB resources of a new TB) in the remaining unused resources. The new sub-TB resources may belong to a new TB or to the same TB of the ongoing HARQ process. As an example of the new sub-TB resources belonging to a new TB, a DL transmission may include CBs of a first TB being retransmitted along with CBs of a second TB (e.g., being transmitted for the first time or retransmitted but with a different retransmission number (e.g., RV number)). As an example of the new sub-TB resources belonging to the same TB of the ongoing HARQ process, a first transmission may include a subset of the CBs (e.g., all the CBs) of a TB, and a retransmission may include a combination of retransmitted CBs from the first transmission and a set of CBs, also belonging to the same TB, being transmitted for the first time. A TB could be mapped to multiple slots and the retransmission number of each CB per slot may be independent.

A WTRU processor may be configured (e.g., where a slot is used to transmit different portions of different TBs) to provide HARQ feedback for any of: portions of each TB (e.g., sub-TB feedback like CB group-level feedback), each TB (e.g., per-TB feedback for each TB) and/or bundled TBs (e.g., multiplexed feedback for some or all the TBs included in the slot). A HARQ feedback method for a single TB per slot can be reused for multiple TBs per slot. For example, a WTRU may provide WTRU selected feedback by transmitting feedback only for TBs within a slot that have ACK.

Indication of retransmitted CBG index may be used. There may be a mismatch of the CBGs for which a WTRU fed back NACK and the CBGs that are retransmitted. The mismatch may be due to erroneous decoding of the HARQ feedback by the gNB or a mismatch in available resources for retransmission that may not enable the WTRU to receive all retransmitted CBGs in a single retransmission. As such, the CBGs that are being retransmitted may be indicated in a downlink assignment (e.g., DCI) for retransmission.

A bit map covering the original CBGs comprised in a TB may be included in a retransmission scheduling assignment. Each bit in the bitmap may indicate whether a particular CBG is included in the retransmission. This may be prohibitive for a large transmission bandwidth requiring large number of CBGs. When re-segmenting CBGs for retransmission, the bitmap may need to be more adaptive. For example, the total number of (re)transmitted CBGs may be indicated to a WTRU and may enable the WTRU to properly interpret the CBG bitmap.

Implicit numbering of CBG indices in a first transmission (e.g., based on transmitted order in frequency first and time second) combined with explicit indication of CBG indices for retransmission may be used. Compression methods such as those discussed for CBG based feedback (e.g., pattern based) may be reused for indication of retransmitted CBGs.

The WTRU may receive an indication for a retransmission of a CBG. Such an indication may include the CBG index and possibly an offset value. The offset value may indicate to the WTRU processor the starting point (e.g., the resource element, or the CB) within a CBG for which retransmission is being performed. The WTRU may not expect a retransmission of any RE of the CBG located before the point indicated by the offset value.

Timing between transmissions, retransmissions and HARQ feedback may be used. The timing relationship between a transmission and HARQ feedback for that transmission may be indicated in the scheduling assignment. The timing may be in steps of slot size used for the scheduling of the transmission. However, in cases where the size of a slot used for retransmission differs from that used for a previous (re)transmission of the same HARQ process, there may be inconsistencies on the interpretation of timing offsets. The timing offset between a (re)transmission and its HARQ feedback, as indicated to the WTRU may always be in units of the slot size used for the original transmission of the HARQ process or the slot size of the respective (re)transmission associated to a HARQ feedback. The timing offset between feedback for a (re)transmission and a first DL control channel occasion where a WTRU may receive from the wireless communications network scheduling for another retransmission of the HARQ process, may also be in units of slot size used for the original transmission or the most recent (re)transmission.

Soft combining of (re)transmitted soft data may be beneficial and/or may improve decoding performance. A WTRU may be indicated by the wireless communications network for whether a retransmitted CB (or sub-TB resource) can be combined with one or more previous (re)transmissions of the CB (or sub-TB resource). A subset of CBs retransmitted may be fit to be combined with the same CBs transmitted in a first subset of previous (re)transmissions (e.g., all previous (re)transmissions). Another subset may be combined with a second subset of previous (re)transmissions. For example, a WTRU may receive an original transmission and a first retransmission of a set of CBs from the wireless communications network. Upon receiving a second retransmission of the same set of CBs, the WTRU may be instructed by the wireless communications network that a subset of the CBs may be combined (e.g., only combined) with those received in the original transmission (e.g., not combined with those received in the first retransmission). This may be beneficial in the event that puncturing of the subset of CBs happened in the first retransmission. Combining with a punctured resource may reduce the BER performance and may lead to an unnecessarily high number of retransmissions (or outright failed transmissions).

The ability to combine data for a TB (or sub-TB resource) over different (re)transmissions may be indicated dynamically. For example, the assignment of the DL (re)transmission may include an indication of a list of previous transmissions with which a TB or sub-TB resource may be combined. The indication may be implicit. An example of implicit indication may be whether feedback for a previous transmission from a WTRU was requested. For example, requesting a feedback for a TB or sub-TB resource may indicate to the WTRU that it may use it for combining. In another example, if a WTRU is not provided with an indication of a puncturing event, the WTRU processor may determine that the data may be combined with other (re) transmissions.

A WTRU processor may determine (e.g., autonomously determine) a set of (re)transmissions for which the WTRU may perform soft combining (e.g., per sub-TB (e.g., CB) resource). For example, a WTRU processor may use a subset of (re)transmissions based on an expected demodulation performance. A WTRU processor may determine that the demodulation performance of one or more retransmissions is/are below a certain threshold and may discard the soft data of the one or more (re)transmissions associated to the resource on which the WTRU performed the measurement.

UL retransmission of CBG may be performed by the WTRU processor.

A WTRU processor may (e.g., be required to) retransmit a subset of CBGs from those transmitted in a previous transmission to the wireless communications network. Methods described herein for DL retransmission of CBGs may also be applicable to UL retransmission of CBGs. Thus, the methods described herein with respect to the DL may be equally applicable to UL and these examples are not meant to be limited to a certain transmission direction.

When a WTRU blanks the resources of a CBG not being retransmitted, the WTRU processor may reallocate the power to another ongoing transmission. For example, a WTRU may have multiple UL transmissions due to carrier aggregation or dual connectivity. The UL power control may depend on the number of active transmissions. A WTRU processor may consider all active transmissions in a symbol to determine the appropriate power sharing among different UL transmissions. Due to zero-power transmission of some CBG on a carrier, different portions of transmissions on other carriers are allotted varying transmission power. For example, if a zero-power transmission of a CBG on a first carrier is being performed, then the WTRU processor may allocate power that would typically be used for the first carrier to a transmission of a second carrier.

An uplink interference preemption indication may be provided. An indication may comprise intra-WTRU interference/preemption.

In an example, high priority/low-latency data may arrive at a WTRU buffer. A WTRU processor may interrupt an ongoing uplink transmission for lower priority data, for example, even after a network may have received parts of the low priority data, e.g., within a certain time slot. This type of event may be referred to as an intra-WTRU "uplink preemption," where multiple transmissions originate from the same WTRU.

A WTRU processor may inform a network about an uplink preemption, for example, so the network may realize that part of data transmitted within a (e.g., current) slot may be for a different transmission of higher priority data. A network (e.g., informed by a WTRU about uplink preemption) may discard lower priority data that may be sent on interfered resources. This may be referred to as a preemption indication. A preemption indication may be used by a receiver, for example to manage its HARQ soft buffer. In an example, a receiver may choose to flush or discard data that may be received on an indicated portion for a low priority transmission. A receiver may (e.g., also) use an indication, for example, when a (e.g., subsequent) transmission may be received for an interfered portion of data.

A WTRU may indicate an uplink preemption event, for example, explicitly or implicitly to a wireless communications network. An explicit indication may be in the form of a resource indication. For example, an indication may point to a resource in the time domain, frequency domain or time-frequency domain. An indication may (e.g., additionally or alternatively, for example, in a context of code-block based HARQ) point to one or more code blocks (CBs) or code block groups (CBG) from a low priority transmission that may have been (e.g., were) preempted.

A preemption indication may be sent, for example, using a new UCI field within a PUSCH channel. A UCI may be sent, for example, before preemption occurs or after preemption. In an (e.g., additional or alternative) example, a (e.g., special) control channel (e.g., specific to a high priority transmission) may carry an indication, for example, before or after a preemption event. In an example, a front-loaded PUCCH may accompany a high priority transmission, which may include an indication.

A preemption may (e.g., also) be an encoded part of a CB or CBG, for example, by masking an attached CRC or by adding (e.g., special) bits, e.g., to convey to a receiver that CBs or CBGs may be (e.g., are) preempted.

A WTRU may (e.g., also) indicate a preemption event using, for example, an in-band indication, which may be linked to a type of uplink resource that may be used to transmit high priority data (e.g., semi-persistent, grant-free or scheduled).

An indication may comprise inter-WTRU interference/preemption.

In an example, a WTRU may not have enough resources to transmit higher priority data. A WTRU may occupy and preempt resources that may be used by other WTRUs that may be sending on-going lower priority data. Interference may be indicated to other WTRUs occupying the medium, for example, so that they may temporarily abort their ongoing transmissions of lower priority data. This may be referred to, for example, as an "inter-WTRU uplink preemption indication."

An inter-WTRU uplink preemption indication may be implemented, for example, by allowing a block of resources to be used by multiple WTRUs for low and high priority data. A preemption indication may be useful, for example, in a high cell load scenario where resources may be occupied by lower priority data.

An inter-WTRU uplink preemption indication may be attached, for example, to a (e.g., each) resource. In an example, an RS may be sent on part of a PRB to occupy it, for example (e.g., only) when being used to transmit higher priority data. WTRUs that may be using shared resources may check whether a resource may be used by higher priority WTRUs, for example, before occupying the medium (e.g., by sensing or decoding an RS that may be unique to each resource). A network node may (e.g., additionally or alternatively) flag usage of a resource to other (e.g., hidden) WTRUs that may not detect usage of a resource, for example, by sending an RS from a serving cell (e.g., masked by its cell ID) or by conveying information on a downlink control channel.

An inter-WTRU uplink preemption indication may be indicated in a different procedure, for example, without blocking part of shared resources (e.g., solely) to indicate a preemption. In an example, an inter-WTRU uplink preemption indication may be sent on or with uplink control information (e.g., on a UCI part of a PUSCH or on a PUCCH). A network may (e.g., then) instruct other WTRUs that may (e.g., seek to) occupy a medium to avoid or suspend their transmission(s). This may be conveyed, for example, on a downlink control channel. WTRUs with interrupted transmissions may resume their transmissions of lower priority data, for example, when the medium may no longer be occupied (e.g., for high priority transmission(s)), when a configured suspension timer expiries and/or when signaled by a network.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

Systems, methods, and instrumentalities have been disclosed for receiver feedback in wireless systems. Receiver feedback format, content, type and/or timing may be determined as a function of, for example, a hybrid automatic repeat request (HARQ) processing state corresponding to, for example, a sequence in transmission for a HARQ process, a maximum time for the HARQ process to succeed, measured or estimated link quality, demodulation performance and/or a number of codeblocks successfully decoded. Receiver feedback format, content, type and/or timing may be determined as a function of, for example, configuration of a wireless transmit/receive unit (WTRU), the configuration indicating at least one of a type of soft-combining processing to apply in a HARQ process, a HARQ operating point for the HARQ process, one or more reference transmissions for controlling a type of HARQ feedback for the HARQ process and a feedback suppression parameter for one or more transmissions in a sequence associated with the HARQ process or a transport block (TB). Uniform and non-uniform CB-to-CBG mapping may be provided (e.g., by a WTRU) based on, for example, one or more parameters, interference and channel conditions and/or a probability of or actual pre-empting transmissions. A CB to CBG mapping indication may be provided, for example, in support of selecting a CB to CBG mapping from multiple CB to CBG mappings. Intra- and inter-WTRU interference/preemption indications may be provided.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The functions described herein may be implemented on for example UR-LLC communication channels between a WTRU and a wireless communications system. A WTRU and the wireless communications system may have one of more computer processors configured (e.g., programmed with executable instructions) to accomplish the functions as describe herein. For example, a WTRU may have a processor that is configured to communicate with the wireless communications network (e.g., using UR-LLC communications). The WTRU processor may be configured to receive first downlink control information (DCI) that indicates whether transport block (TB)-based hybrid automatic repeat request (HARQ) feedback should be provided for a downlink transmission or if code block group (CBG)-based HARQ feedback should be provided for the downlink transmission. The WTRU processor may be configured to receive the downlink transmission, associated with the first DCI, that includes a transport block that has one or more code blocks. The WTRU processor may be configured to attempt to decode the one or more code blocks of the transport block. The WTRU processor may be configured to determine that the first DCI indicates that CBG-based HARQ feedback should be provided. If the processor determines that the first DCI indicates that CBG-based HARQ feedback should be provided, the WTRU processor may be configured to determine a mapping of the one or more code blocks into one or more CBGs; determine HARQ feedback for at least one of the one or more CBGs based on whether corresponding code blocks for the at least one CBG were successfully decoded, and transmit the HARQ feedback for the one or more CBGs to the wireless communications network. The WTRU processor may be configured to determine that the first DCI indicates that TB-based HARQ feedback should be provided. If the WTRU processor determines that the first DCI indicates that TB-based HARQ feedback should be provided, the WTRU processor may be configured to determine HARQ feedback for the transport block, and transmit the HARQ feedback for the transport block to the wireless communications network.

The mapping may be a mapping of the one or more code blocks to the code block group in at least one of frequency or time. The mapping may be based on one or more of: a number of subcarriers or OFDM symbols assigned to the code block group or the transmission, a maximum code block length, a number of code block groups in the transmission, a number of code blocks in the transmission; and a number of time symbols and/or resource blocks occupied by a potential pre-empting transmission.

The determined HARQ feedback for the one or more CBGs may be an ACK if each of the corresponding code blocks was successfully decoded and a NACK if one or more of the one or more code blocks was not successfully decoded. The WTRU processor may be configured to receive a retransmission from the wireless communications network in response to a transmitted NACK. The wireless communications network may have a processor that is configured to receive the transmitted ACK or NACK and to determine to send a retransmission if a NACK is received.

The WTRU processor may be configured to receive a second DCI that is for a retransmission. The second DCI may indicate which CBGs are being retransmitted. The second DCI may indicate which CBGs included in the retransmission can be combined with previously received CBGs when performing soft decoding. The second DCI may include a bitmap that may be used to indicates which CBGs included in the retransmission can be combined with previously received CBGs when performing soft decoding. The wireless communications network may have a processor that is configured to determine to send the second DCI and the contents of the second DCI.

The WTRU processor may be configured to monitor for first downlink control information and to monitor for second downlink control information based on a preemption instruction from the wireless communications network. The wireless communications network may have a processor that is configured to determine to send preemption instructions to the WTRU.

The WTRU may comprise a HARQ buffer. The WTRU processor may be configured to manage the HARQ buffer and to discard data in the HARQ buffer if the one or more code blocks are not successfully decoded.

The WTRU processor may be configured to determine a preemption indication to send in uplink control information to the wireless communications network if the one or more code blocks are not successfully decoded.

The wireless communications network may have a processor that is configured to determine send first downlink control information (DCI) that indicates whether transport block (TB)-based hybrid automatic repeat request (HARQ) feedback should be provided for a downlink transmission or if code block group (CBG)-based HARQ feedback should be provided for the downlink transmission and to transmit the first downlink control information. The wireless communications network may have a processor that is configured to receive a transmitted HARQ feedback including a TB-based HARQ feedback.

Each of the computing systems described herein may have one or more computer processors having memory that are configured with executable instructions or hardware for accomplishing the functions described herein including determining the parameters described herein and sending and receiving messages between entities (e.g., WTRU and network) to accomplish the described functions. The processes described above may be implemented in a computer program, software, and/or firmware incorporated in a computer-readable medium for execution by a computer and/or processor.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) comprising, a processor and a transceiver which are configured to:
   receive a first downlink control information (DCI) associated with a first downlink transmission;
   receive the first downlink transmission that comprises at least one transport block (TB), wherein the at least one TB comprises one or more code block groups (CBGs), and wherein each CBG comprises one or more code blocks (CBs);
   on condition that the first DCI indicates that a CB-based type of hybrid automatic repeat request (HARQ) feedback is to be provided for the first downlink transmission, transmit a first CB-based HARQ feedback associated with the first downlink transmission;
   receive a second DCI associated with a second downlink transmission, wherein the second DCI indicates that the second downlink transmission comprises a retransmission of at least a portion of the first downlink transmission, and the second DCI includes a bitmap indicating which of the respective CBGs of the first downlink transmission are included in the retransmission;
   receive the second downlink transmission; and
   on condition that the second DCI indicates that the CB-based type of HARQ feedback is to be provided for the second downlink transmission, transmit a second CB-based HARQ feedback associated with the second downlink transmission.

2. The WTRU of claim 1, wherein the processor is further configured to:
determine a mapping of the one or more code blocks into one or more CBGs in at least one of a frequency domain or a time domain, and
wherein the first downlink transmission and/or the second downlink transmission is received using the mapping.

3. The WTRU of claim 2, wherein the mapping is based on one or more of: a number of subcarriers or orthogonal frequency division multiplexing (OFDM) symbols assigned to the one or more code block groups, a maximum code block length, a number of CBGs in the first downlink transmission, a number of code blocks in the first downlink transmission, a number of time symbols occupied by a potential pre-empting transmission, and/or a number of resource blocks occupied by the potential pre-empting transmission.

4. The WTRU of claim 1, wherein the first CB-based HARQ feedback associated with the first downlink transmission or the second CB-based HARQ feedback associated with the second downlink transmission is an acknowledgement (ACK) if each of the corresponding code blocks was successfully decoded and a negative acknowledgement (NACK), if one or more of the corresponding code blocks were not successfully decoded.

5. The WTRU of claim 1, wherein the second DCI indicates the CBGs included in the retransmission can be combined with the corresponding CBGs previously received in the first downlink transmission.

6. The WTRU of claim 1, further comprising:
a HARQ buffer,
wherein the processor is further configured to manage the HARQ buffer and to discard data in the HARQ buffer if the one or more code blocks are not successfully decoded.

7. The WTRU of claim 1, wherein the processor and the transceiver are further configured to receive a number of CBGs count via a higher layer configuration, the number of CBGs count indicating the number of CBGs received by the WTRU in the first downlink transmission which is a physical downlink shared channel (PDSCH) transmission.

8. A method implemented by a wireless transmit/receive unit (WTRU), the method comprising:
receiving a first downlink control information (DCI) associated with a first downlink transmission;
receiving the first downlink transmission that comprises at least one transport block (TB), wherein the at least one TB comprises one or more code block groups (CBGs), and wherein each CBG comprises one or more code blocks (CBs);
on condition that the first DCI indicates that a CB-based type of hybrid automatic repeat request (HARQ) feedback is to be provided for the first downlink transmission, transmitting a first CB-based HARQ feedback associated with the first downlink transmission;
receive a second DCI associated with a second downlink transmission, wherein the second DCI indicates that the second downlink transmission comprises a retransmission of at least a portion of the first downlink transmission, and the second DCI includes a bitmap indicating which of the respective CBGs of the first downlink transmission are included in the retransmission;
receiving the second downlink transmission; and
on condition that the second DCI indicates that the CB-based type of HARQ feedback is to be provided for the second downlink transmission, transmitting a second CB-based HARQ feedback associated with the second downlink transmission.

9. The method of claim 8 further comprising:
determining a mapping of the one or more code blocks into one or more CBGs in at least one of a frequency domain or a time domain,
wherein the first downlink transmission and/or the second downlink transmission is received using the mapping.

10. The method of claim 9, wherein the mapping is based on one or more of: a number of subcarriers or orthogonal frequency division multiplexing (OFDM) symbols assigned to the one or more code block groups, a maximum code block length, a number of CBGs in the first downlink transmission, a number of code blocks in the first downlink transmission, one or more of a number of time symbols occupied by a potential pre-empting transmission, and/or a number of resource blocks occupied by the potential pre-empting transmission.

11. The method of claim 8, wherein the first CB-based HARQ feedback associated with the first downlink transmission or the second CB-based HARQ feedback associated with the second downlink transmission is an acknowledgement (ACK) if each of the corresponding code blocks was successfully decoded and a negative acknowledgement (NACK), if one or more of the corresponding code blocks were not successfully decoded.

12. The method of claim 8, wherein the second DCI indicates the CBGs included in the retransmission can be combined with the corresponding CBGs previously received in the first downlink transmission.

13. The method of claim 8, further comprising:
a HARQ buffer; and
managing the HARQ buffer and discarding data in the HARQ buffer if the one or more code blocks are not successfully decoded.

14. The method of claim 8, further comprising receiving a number of CBGs count via a higher layer configuration, the number of CBGs count indicating the number of CBGs received by the WTRU in the first downlink transmission which is a physical downlink shared channel (PDSCH) transmission.

15. The WTRU of claim 1, wherein the first downlink transmission or the second downlink transmission is associated with a HARQ process.

16. The method of claim 8, wherein the first downlink transmission or the second downlink transmission is associated with a HARQ process.

* * * * *